United States Patent [19]
Harada et al.

[11] Patent Number: 6,095,023
[45] Date of Patent: Aug. 1, 2000

[54] METHODS OF CUTTING AND MOUNTING SOFT PARTS AND APPARATUSES FOR CUTTING AND MOUNTING SOFT PARTS

[75] Inventors: Hiromitsu Harada, Ushiku; Norio Nikaido, Tsuchiura; Yasuo Karube, Tsukuba, all of Japan

[73] Assignee: Canon Kabushiki Kaisha, Tokyo, Japan

[21] Appl. No.: 08/984,499

[22] Filed: Dec. 3, 1997

[30] Foreign Application Priority Data

Dec. 5, 1996 [JP] Japan ................................ 8-325323
Nov. 25, 1997 [JP] Japan ................................ 9-323433

[51] Int. Cl.⁷ ................................................ B26D 7/08
[52] U.S. Cl. .................... 83/22; 83/24; 83/55; 83/152; 83/956
[58] Field of Search .................... 83/22, 24, 39, 83/50, 55, 701, 956, 649, 451, 152, 881; 156/73.3, 580.2, 285, 73.1, 580.1

[56] References Cited

U.S. PATENT DOCUMENTS

| 4,071,385 | 1/1978 | Kuris ........................ 156/73.1 |
| 4,100,701 | 7/1978 | Bessaguet ................... 51/157 |
| 4,516,461 | 5/1985 | Schaeffer ................... 83/881 |
| 4,685,602 | 8/1987 | Hama ........................ 225/93 |
| 4,856,393 | 8/1989 | Braddon ..................... 83/50 |
| 4,945,795 | 8/1990 | Tone ........................ 83/27 |
| 5,129,295 | 7/1992 | Geffros et al. .............. 83/19 |
| 5,160,573 | 11/1992 | Takagi et al. ............... 156/510 |
| 5,203,748 | 4/1993 | Sawada et al. ............... 475/183 |
| 5,271,292 | 12/1993 | Sawada et al. ............... 74/479 BF |
| 5,392,505 | 2/1995 | Harada ...................... 29/450 |
| 5,582,086 | 12/1996 | Kogame ...................... 83/152 |
| 5,735,984 | 4/1998 | Hoff et al. ................. 156/73.3 |
| 5,842,398 | 12/1998 | Jenkins et al. .............. 83/55 |

FOREIGN PATENT DOCUMENTS 7-227799 8/1995 Japan.
8-150600 6/1996 Japan.

*Primary Examiner*—M. Rachuba
*Assistant Examiner*—Stephen Choi
*Attorney, Agent, or Firm*—Fitzpatrick, Cella, Harper & Scinto

[57] ABSTRACT

Soft part cutting and mounting methods and soft part cutting and mounting apparatuses are capable of cutting and mounting without human intervention by using an automatic soft part apparatus. The apparatus which uses a sheet material continuously formed from a release sheet having at least a release layer on a surface and including continuously formed tack paper and a soft member having an adhesive layer temporarily adhered to the release layer to finally adhere to an article, and cuts the soft member with the adhesive layer into a predetermined shape. The sheet material is continuously intermittently fed by a sheet material convey unit so as to stop at a cutting position. In the cutting position, a contoured cutting blade moved with respect to the soft member by a first elevating mechanism is moved to the release layer, the cut soft part is drawn by suction by a suction head disposed in a portion surrounded by the contoured cutting blade and vertically moved by a second elevating mechanism, and the release sheet is drawn by suction by a suction unit including an ultrasonic wave application device for transmitting ultrasonic vibration at a frequency of 10 kHz or more. The soft member is cut together with the adhesive layer from the sheet material by controlling the driving of the individual mechanisms and components, thereby obtaining the soft part.

3 Claims, 30 Drawing Sheets

F I G. 26
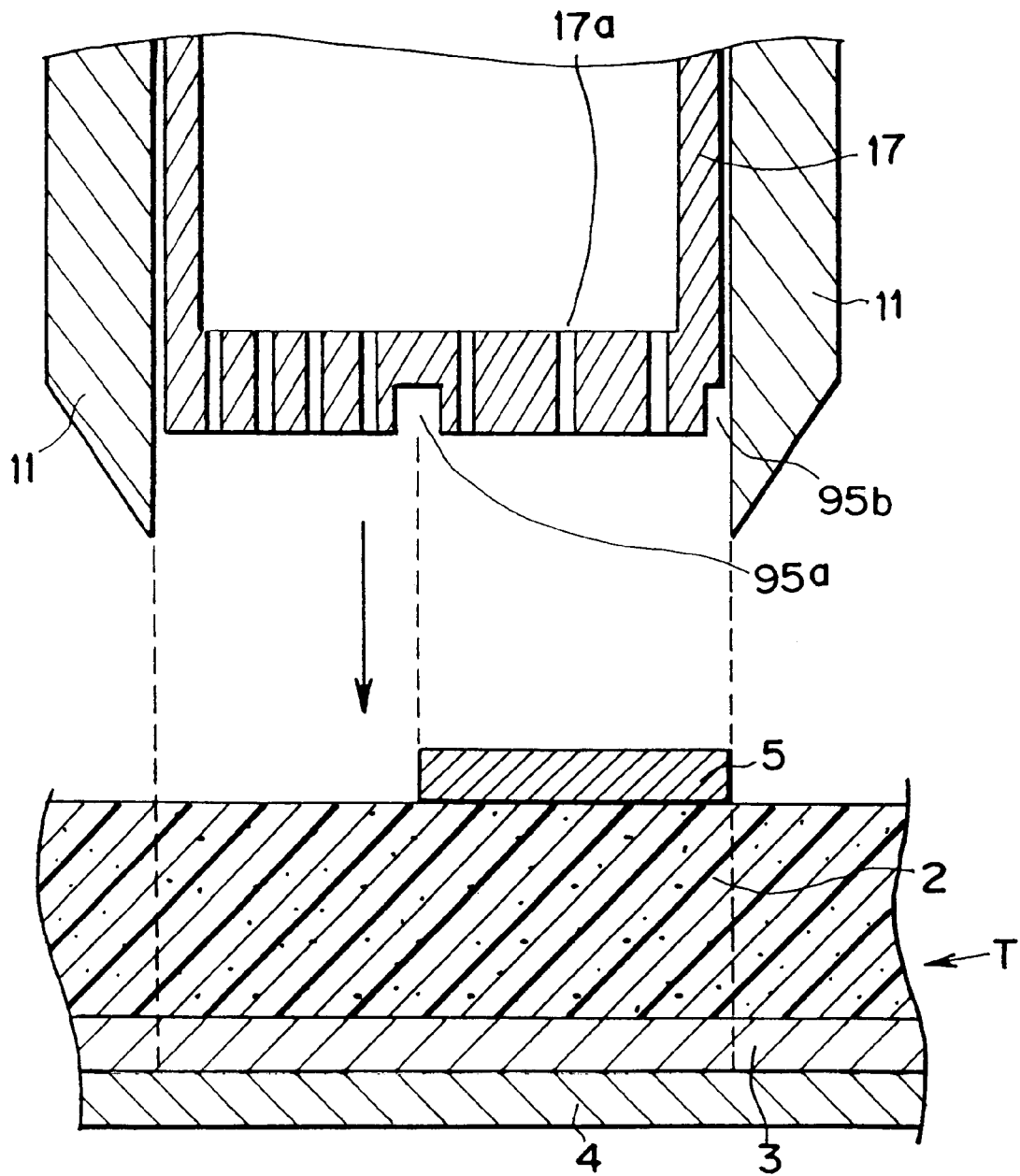

F I G. 31
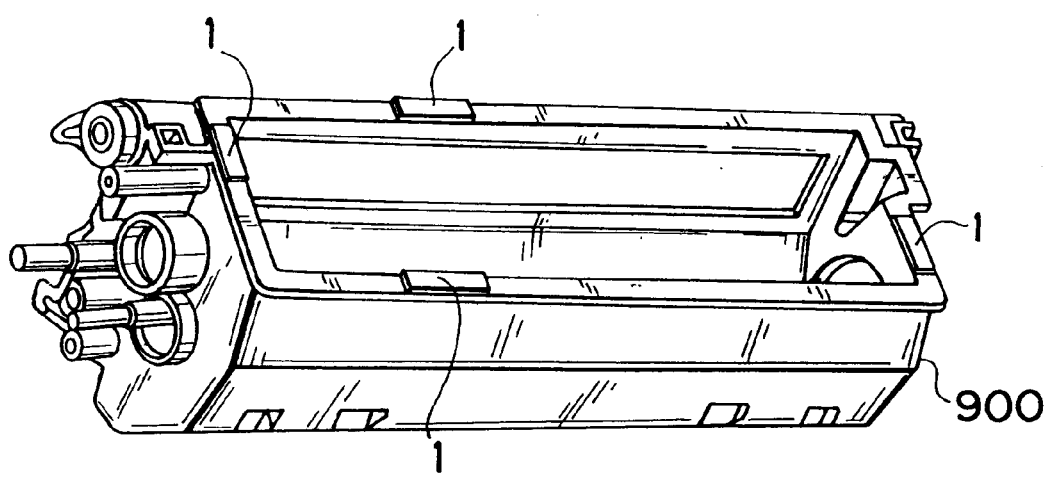

METHODS OF CUTTING AND MOUNTING SOFT PARTS AND APPARATUSES FOR CUTTING AND MOUNTING SOFT PARTS

BACKGROUND OF THE INVENTION

Field of the Invention

The present invention relates to methods of cutting and mounting soft parts and apparatuses for cutting and mounting soft parts and, more particularly, to methods and apparatuses for cutting a sheet material formed by adhering a double-coated tape with a release sheet to a porous soft member into a predetermined shape, separating the cut sheet material from the release sheet, and adhering the separated sheet material to an article.

Conventionally, various methods and apparatuses have been proposed to cut a sheet material, which is continuously formed by adhering it to one surface of a porous soft material via a double-coated tape as an adhesive layer to be temporarily adhered to a release sheet, into a predetermined shape on the release sheet, and separate the cut sheet material from the release sheet.

FIG. 32 is a view showing the principle of operation of "a method and an apparatus for cutting a gel member" disclosed in Japanese Patent Laid-Open No. 8-150600 so that the view is close to the arrangement of the present invention. Referring to FIG. 32, a horn 1006 is fixed to an ultrasonic generating means, and a self-adhesive gel pad 1001 is arranged on a work surface 1006a of the horn 1006 via a contact plate 1002. A cutting blade 1011 having a predetermined shape is arranged on this self-adhesive gel pad 1001. While the cutting blade 1011 is moved to a position indicated by the broken lines, ultrasonic vibration is applied to the horn 1006 and the cutting blade 1011. Consequently, the material is cut into a predetermined shape while being prevented from sticking to the blade.

This prior art can cut a material which is difficult to cut. However, since the gel pad is positioned in a portion surrounded by the cutting blade after cutting, it is difficult to extract the gel pad. This makes handling of the apparatus very difficult. Therefore, it is difficult to successively automate the cutting step and its subsequent steps.

Accordingly, the steps of cutting and separating a sheet material from the release sheet (and pasting a soft part 1) are commonly separated. That is, a sheet material supplied from a reel on which the material is wound is cut by a hydraulic or air-pressure press apparatus having an output of a few tons, which is also a cutting apparatus incorporating a cutting blade (mold) primarily using a Thomson blade or a soft part blade. The sheet material is full-cut together with a release sheet or half-cut so that the release sheet is left uncut into a predetermined shape by force cutting by the cutting apparatus, thereby obtaining a soft part punched into the predetermined shape. Thereafter, the soft part is manually separated from the release sheet and manually pasted on a work as an object.

On the other hand, a porous elastic member such as urethane foam is difficult to accurately cut into a predetermined shape because of its softness.

It is, therefore, being demanded to develop a method and an apparatus capable of operating with high productivity for the technique of cutting a sheet material, which is formed by adhering an elastic member such as urethane foam onto a base member such as paper via an adhesive layer, into a predetermined shape.

An elastic member with softness such as urethane foam is used as a soft part 1 of a vessel, and it is being demanded to develop a technique of cutting the elastic member 1 into a complicated shape combining curves of the soft part of the vessel.

Unfortunately, the above prior art has the following problems.

Especially when the sheet material is a porous soft (elastic) member, the shape of the sheet material deforms by sheet compression by the cutting blade if force cutting is performed by the press apparatus and the cutting blade. Consequently, the shapes after the cutting vary to result in low cutting accuracy. Especially when the sheet material is half-cut to leave the release sheet uncut, the cutting depth changes in accordance with slight differences in thickness between sheet materials resulting from lot differences or with cutting blade conditions (e.g., wear of the blade edge, adhesion of the self-adhesive to the blade, and a change in the mounting position of the blade caused by replacement). As a consequence, the sheet material is left uncut, or the release sheet is undesirably cut. Accordingly, it is necessary to frequently slightly adjust the cutting depth.

Since the output of the press apparatus is very high, i.e., several tons are necessary, the size, cost, and installation space of the apparatus are increased.

Also, a soft part is manually separated from the release sheet and manually pasted as described previously. Therefore, it is difficult to totally automate a series of cutting, separating, and pasting steps. This results in low productivity and the difficulties of stabilizing the quality and performing continuous production. Human intervention naturally produces variations in the accuracy of pasting position to an article and the pasted state, so an accuracy limit is pointed out.

SUMMARY OF THE INVENTION

The present invention, therefore, has been made in consideration of the above problems and has as its object to provide soft part cutting and mounting methods and soft part cutting and mounting apparatuses capable of cutting and mounting without human intervention by using an automatic soft part apparatus which uses a sheet material continuously formed from a release sheet having at least a release layer on a surface and including continuously formed tack paper and a soft member having an adhesive layer temporarily adhered to the release layer to finally adhere to an article, and cuts the soft member with the adhesive layer into a predetermined shape.

It is another object of the present invention to provide soft part cutting and mounting methods and soft part cutting and mounting apparatuses capable of cutting and pasting without human intervention by using an automatic soft part apparatus which uses a sheet material continuously formed from a soft member having an adhesive layer and further including a protective layer, and cuts the soft member with the adhesive layer into a predetermined shape.

To solve the above problems and achieve the above objects, the present invention includes the following constitutions.

A soft part cutting method which uses a sheet material continuously formed from a continuously formed release sheet having at least a release layer on a surface and a soft member having an adhesive layer temporarily adhered to the release layer to finally adhere to an article, and cuts the soft member together with the adhesive layer into a predetermined shape, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, and drawing the cut soft part by suction by first suction means disposed in a portion surrounded by the contoured cutting blade and vertically moved by second elevating means, drawing the release sheet by suction in the cutting position by second suction means including ultrasonic wave application means for transmitting ultrasonic vibration at a frequency of 10 kHz or more, and cutting the soft member together with the adhesive layer from the sheet material by controlling driving of the sheet material convey means, the first and second elevating means, the first and second suction means, and the ultrasonic wave application means at predetermined timings by control means connected to the means, thereby obtaining the soft part.

A soft part cutting method which uses a sheet material continuously formed from a continuously formed release sheet having at least a release layer on a surface and a soft member having an adhesive layer temporarily adhered to the release layer to finally adhere to an article, and cuts the soft member together with the adhesive layer into a predetermined shape, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, compressing and cutting the soft member at a predetermined compression ratio by moving first suction means disposed in a portion surrounded by the contoured cutting blade and vertically moved by second elevating means, and drawing the cut soft part by suction by the first suction means, drawing the release sheet by suction in the cutting position by second suction means including ultrasonic wave application means for transmitting ultrasonic vibration at a frequency of 10 kHz or more, and cutting the soft member together with the adhesive layer from the sheet material into a predetermined shape by controlling driving of the sheet material convey means, the first and second elevating means, the first and second suction means, and the ultrasonic wave application means at predetermined timings by control means connected to the means, thereby obtaining the soft part.

A soft part cutting method which uses a sheet material continuously formed from a continuously formed release sheet having at least a release layer on a surface and a soft member made from a porous material and having an adhesive layer including a double-coated self-adhesive tape temporarily adhered to the release layer to finally adhere to an article, and cuts the soft member together with the adhesive layer into a predetermined shape, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, compressing and cutting the porous material at a predetermined compression ratio by moving first suction means disposed in a portion surrounded by the contoured cutting blade and vertically moved by second elevating means, and drawing the cut soft part by suction by the first suction means, drawing the release sheet by suction in the cutting position by second suction means including ultrasonic wave application means for transmitting ultrasonic vibration at a frequency of 10 kHz or more, and cutting the soft member together with the adhesive layer from the sheet material into a predetermined shape by controlling driving of the sheet material convey means, the first and second elevating means, the first and second suction means, and the ultrasonic wave application means at predetermined timings by control means connected to the means, thereby obtaining the soft part.

Letting a thickness of the soft member in a natural state be T1 and a thickness of the soft member compressed by the first suction means moved by the second elevating means be T2, the predetermined compression ratio is defined by T2÷T1 and ranges from 1 to 0.1.

The cut soft part is held by suction by the first suction means by setting a suction force of the first suction means vertically moved by the second elevating means to be smaller than a suction force of the second suction means including the ultrasonic wave application means.

A soft part cutting apparatus which uses a sheet material continuously formed from a continuously formed release sheet having at least a release layer on a surface and a soft member having an adhesive layer temporarily adhered to the release layer to finally adhere to an article, and cuts the soft member together with the adhesive layer into a predetermined shape, comprises sheet material convey means for continuously intermittently feeding the sheet material and stopping the sheet material at a cutting position, first elevating means for moving a contoured cutting blade disposed in the cutting position and having the predetermined shape to the release layer of the soft member and performing the cutting, first suction means disposed in a portion surrounded by the contoured cutting blade and vertically moved inside the contoured cutting blade by second elevating means, the first suction means holding the cut soft part by suction, second suction means for holding the release sheet of the sheet material by suction in the cutting position, the second suction means including ultrasonic wave application means for transmitting ultrasonic vibration at a frequency of 10 kHz or more, and control means connected to the sheet material convey means, the first and second elevating means, the first and second suction means, and the ultrasonic wave application means.

The soft member is compressed and cut at a predetermined ratio by moving the first suction means vertically moved by the second elevating means and the cut soft part is held by suction by the first suction means, the release sheet of the sheet material is held by suction in the cutting position by the second suction means including the ultrasonic wave application means for transmitting ultrasonic vibration at a frequency of 10 kHz or more, and the soft member is cut together with the adhesive layer from the sheet material into a predetermined shape by controlling the sheet material convey means, the first and second elevating means, the first and second suction means, and the ultrasonic wave application means at predetermined timings by the control means connected to the means, thereby obtaining the soft part.

A soft part cutting apparatus which uses a sheet material continuously formed from a continuously formed release sheet having at least a release layer on a surface and a soft member made from a porous material and having an adhesive layer including a double-coated self-adhesive tape temporarily adhered to the release layer to finally adhere to an article, and cuts the soft member together with the adhesive layer into a predetermined shape, comprises sheet material convey means for continuously intermittently feeding the sheet material and stopping the sheet material at a cutting position, first suction means for moving a contoured cutting blade moved by first elevating means with respect to the soft member and having the predetermined shape to the release layer in the cutting position, the first suction means being disposed in a portion surrounded by the contoured cutting blade, vertically moved by second elevating means, compressing and cutting the porous material at a predetermined ratio, and holding the cut soft part by suction, second suction means including ultrasonic wave application means for transmitting ultrasonic vibration at a frequency of 10 kHz or more to hold the release sheet of the sheet material by suction in the cutting position, and control means connected to the sheet material convey means, the first and second elevating means, the first and second suction means, and the ultrasonic wave application means to control the means at predetermined timings, thereby cutting the soft member together with the adhesive layer from the sheet material into a predetermined shape.

Letting a thickness of the soft member in a natural state be T1 and a thickness of the soft member compressed by the first suction means moved by the second elevating means be T2, the predetermined compression ratio is defined by T2÷T1, and the movement of the second elevating means is controlled to make the predetermined compression ratio range from 1 to 0.1.

The cut soft part is held by suction by the first suction means by setting a suction force of the first suction means vertically moved by the second elevating means to be smaller than a suction force of the second suction means including the ultrasonic wave application means.

A soft part mounting method which uses a sheet material continuously formed from a continuously formed release sheet having at least a release layer on a surface and a soft member having an adhesive layer temporarily adhered to the release layer to finally adhere to an article, cuts the soft member together with the adhesive layer into a predetermined shape, and adheres the cut soft part to the article by holding the soft part by suction, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, and holding the cut soft part by suction by first suction means disposed in a portion surrounded by the contoured cutting blade and vertically moved by second elevating means, drawing the release sheet by suction in the cutting position by second suction means including ultrasonic wave application means for transmitting ultrasonic vibration at a frequency of 10 kHz or more after the soft part is separated from the release sheet, and moving the soft part from the cutting position to the article by controlling driving of the sheet material convey means, the first and second elevating means, the first and second suction means, and the ultrasonic wave application means at predetermined timings by control means connected to the means.

A soft part mounting method which uses a sheet material continuously formed from a continuously formed release sheet having at least a release layer on a surface and a soft member having an adhesive layer temporarily adhered to the release layer to finally adhere to an article, cuts the soft member together with the adhesive layer into a predetermined shape, and adheres the cut soft part to the article by holding the soft part by suction, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, compressing and cutting the soft member at a predetermined compression ratio by moving first suction means disposed in a portion surrounded by the contoured cutting blade and vertically moved by second elevating means, and holding the cut soft part by suction by the first suction means, drawing the release sheet of the sheet material by suction in the cutting position by second suction means including ultrasonic wave application means for transmitting ultrasonic vibration at a frequency of 10 kHz or more, and moving the soft part from the cutting position to the article by controlling driving of the sheet material convey means, the first and second elevating means, the first and second suction means, and the ultrasonic wave application means at predetermined timings by control means connected to the means.

A soft part mounting method which uses a sheet material continuously formed from a continuously formed release sheet having at least a release layer on a surface and a soft member made from a porous material and having an adhesive layer including a double-coated self-adhesive layer temporarily adhered to the release layer to finally adhere to an article, and cuts the soft member together with the adhesive layer into a predetermined shape, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, compressing and cutting the porous material at a predetermined compression ratio by moving first suction means disposed in a portion surrounded by the contoured cutting blade and vertically moved by second elevating means, and drawing the cut soft part by suction by the first suction means, drawing the release sheet of the sheet material by suction in the cutting position by second suction means including ultrasonic wave application means for transmitting ultrasonic vibration at a frequency of 10 kHz or more, and moving the soft part from the cutting position to the article by controlling driving of the sheet material convey means, the first and second elevating means, the first and second suction means, and the ultrasonic wave application means at predetermined timings by control means connected to the means.

Letting a thickness of the soft member in a natural state be T1 and a thickness of the soft member compressed by the first suction means moved by the second elevating means be T2, the predetermined compression ratio is defined by T2÷T1 and ranges from 1 to 0.1.

The soft part is held by suction by the first suction means by setting a suction force of the first suction means vertically moved by the second elevating means to be smaller than a suction force of the second suction means including the ultrasonic wave application means, thereby moving the soft part from the cutting position to the article.

A soft part cutting apparatus which uses a sheet material continuously formed from a continuously formed release sheet having at least a release layer on a surface and a soft member having an adhesive layer temporarily adhered to the release layer to finally adhere to an article, cuts the soft member together with the adhesive layer into a predetermined shape, and adheres the cut soft part to the article by holding the soft part by suction, comprises sheet material convey means for continuously intermittently feeding the sheet material and stopping the sheet material at a cutting position, first elevating means for moving a contoured cutting blade disposed in the cutting position and having the predetermined shape to the release layer of the soft member and performing the cutting, first suction means disposed in a portion surrounded by the contoured cutting blade and vertically moved inside the contoured cutting blade by second elevating means, the first suction means holding the cut soft part by suction, second suction means for holding the release sheet of the sheet material by suction in the cutting position, the second suction means including ultrasonic wave application means for transmitting ultrasonic vibration at a frequency of 10 kHz or more, control means connected to the sheet material convey means, the first and second elevating means, the first and second suction means, and the ultrasonic wave application means, and moving means for moving the soft part from the cutting position to the article.

The soft member is compressed and cut at a predetermined ratio by moving the first suction means vertically moved by the second elevating means and the cut soft part is held by suction by the first suction means, the release sheet of the sheet material is held by suction in the cutting position by the second suction means including the ultrasonic wave application means for transmitting ultrasonic vibration at a frequency of 10 kHz or more, and the soft member is cut together with the adhesive layer from the sheet material into a predetermined shape by controlling the sheet material convey means, the first and second elevating means, the first and second suction means, and the ultrasonic wave application means at predetermined timings by the control means connected to the means, thereby obtaining the soft part.

A soft part cutting apparatus which uses a sheet material continuously formed from a continuously formed release sheet having at least a release layer on a surface and a soft member made from a porous material and having an adhesive layer including a double-coated self-adhesive tape temporarily adhered to the release layer to finally adhere to an article, cuts the soft member together with the adhesive layer into a predetermined shape, and adheres the cut soft part to the article by holding the soft part by suction, comprises sheet material convey means for continuously intermittently feeding the sheet material and stopping the sheet material at a cutting position, first suction means for moving a contoured cutting blade moved by first elevating means with respect to the soft member and having the predetermined shape to the release layer in the cutting position, the first suction means being disposed in a portion surrounded by the contoured cutting blade, vertically moved by second elevating means, compressing and cutting the porous material at a predetermined ratio, and holding the cut soft part by suction, second suction means including ultrasonic wave application means for transmitting ultrasonic vibration at a frequency of 10 kHz or more to hold the release sheet of the sheet material by suction in the cutting position, control means connected to the sheet material convey means, the first and second elevating means, the first and second suction means, and the ultrasonic wave application means to control the means at predetermined timings, thereby cutting the soft member together with the adhesive layer from the sheet material into a predetermined shape, and moving means for moving the soft part from the cutting position to the article.

Letting a thickness of the soft member in a natural state be T1 and a thickness of the soft member compressed by the first suction means moved by the second elevating means be T2, the predetermined compression ratio is defined by T2÷T1, and the movement of the second elevating means is so controlled to make the predetermined compression ratio range from 1 to 0.1.

The cut soft part is held by suction by the first suction means by setting a suction force of the first suction means vertically moved by the second elevating means to be smaller than a suction force of the second suction means including the ultrasonic wave application means.

The contoured cutting blade forms a cutting blade smaller than a width of the sheet material, the predetermined shape is a symmetrical rectangle or circle or an asymmetrical profile, and the first suction means is provided inside the contoured cutting blade so as to be vertically movable by the second elevating means.

The contoured cutting blade forms a cutting blade larger than a width of the sheet material, the predetermined shape is a symmetrical rectangle or circle or an asymmetrical profile, and the first suction means is provided inside the contoured cutting blade so as to be vertically movable by the second elevating means.

A soft part cutting method which uses a sheet material continuously formed from a continuously formed release sheet having at least a release layer on a surface and a soft member made from a porous material and having an adhesive layer including a double-coated self-adhesive layer temporarily adhered to the release layer to finally adhere to an article, cuts the soft member together with the adhesive layer into a predetermined shape, and adheres the cut soft part to the article by holding the soft part by suction, comprises the steps of continuously intermittently feeding the sheet material by sheet material convey means and stopping the sheet material at a cutting position, moving a contoured cutting blade moved by first elevating means with respect to the soft member and having the predetermined shape to the release layer in the cutting position, compressing and cutting the porous material at a predetermined compression ratio determined by porosity of the porous material by moving first suction means disposed in a portion surrounded by the contoured cutting blade and vertically moved by second elevating means, drawing the cut soft part by suction by the first suction means, and detecting a moving position of the first suction means by detecting means for detecting start and end, holding the release sheet of the sheet material by suction in the cutting position by second suction means including ultrasonic wave application means for transmitting ultrasonic vibration at a frequency of 10 kHz or more, cutting the soft member together with the adhesive layer from the sheet material into a predetermined shape by controlling driving of the sheet material convey means, the first and second elevating means, the first and second suction means, and the ultrasonic wave application means at predetermined timings by control means connected to the means, and moving the soft part from the cutting position to the article by moving means.

A timing of the ultrasonic vibration by the ultrasonic wave application means is synchronized with the cutting and separation of the sheet material and the ultrasonic vibration is started at the same time or before the cutting is started and stopped at the same time the cutting is performed with the release sheet left uncut or after the separation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 26 is a view for explaining the operation of cutting the sheet material having the protective layer;

FIG. 31 is a perspective view of an outer appearance showing the way a soft part 1 is pasted on a product.

DETAILED DESCRIPTION OF THE PREFERRED EMBODIMENTS

Preferred embodiments of the present invention will be described in detail below with reference to the accompanying drawings.

This embodiment relates to an ultrasonic cutting-separating apparatus for a porous soft sheet material.

FIGS. 1 to 7 are views for explaining the first embodiment of the porous soft material cutting-separating apparatus according to the present invention.

Figure 1:
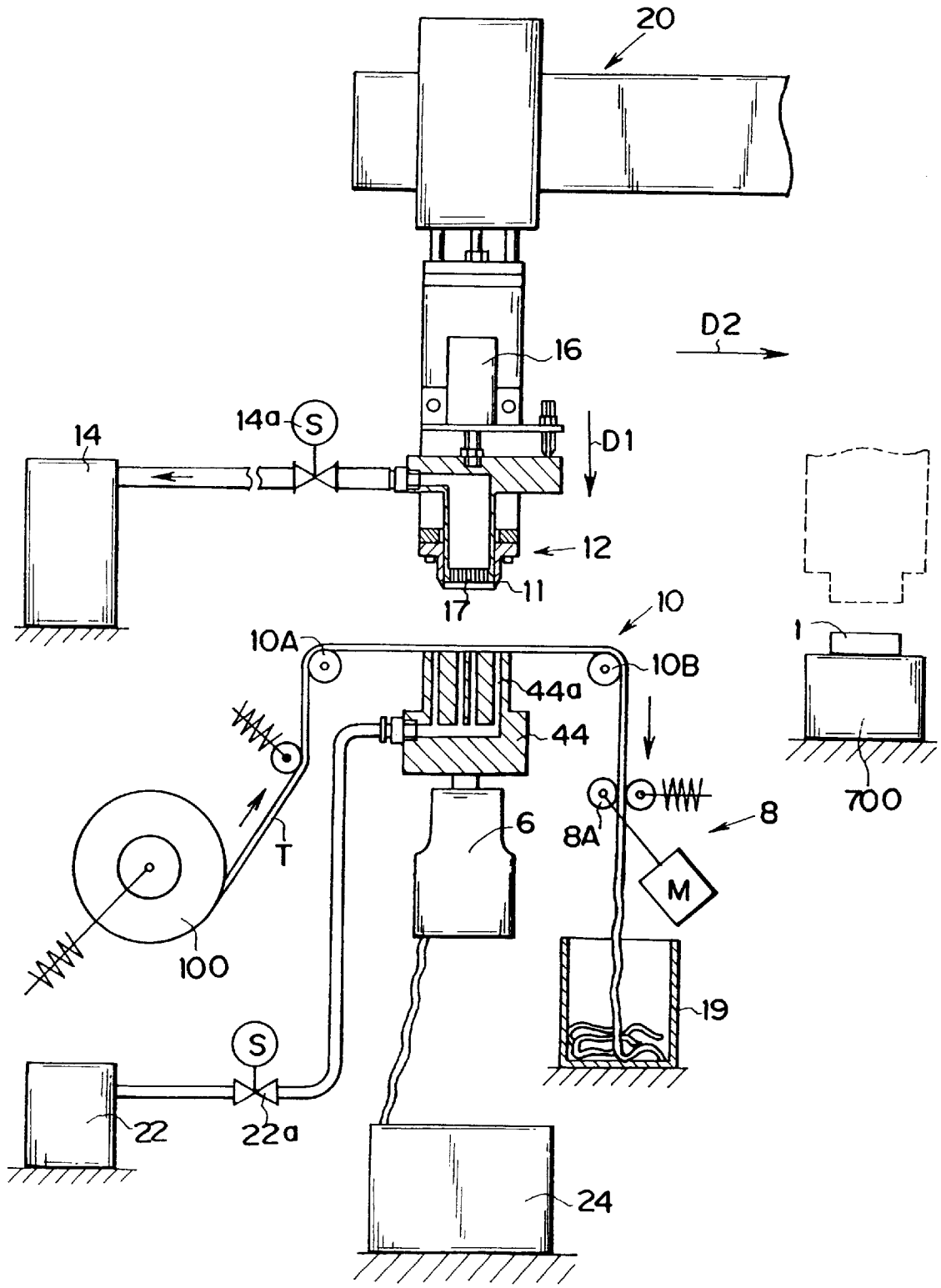
FIG. 1 is a schematic view showing the structure of the first embodiment of the present invention.

FIG. 1 is a view showing the arrangement of the cutting apparatus for practicing the cutting method of the present invention.

Figure 2A:
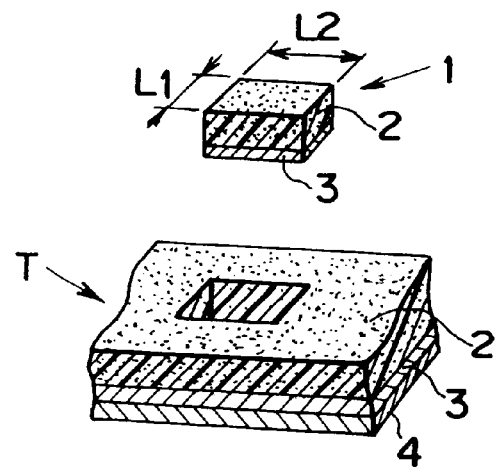
FIG. 2A is a perspective view of an outer appearance showing the way a rectangular soft part 1 is cut from a sheet material T.
Figure 2B:
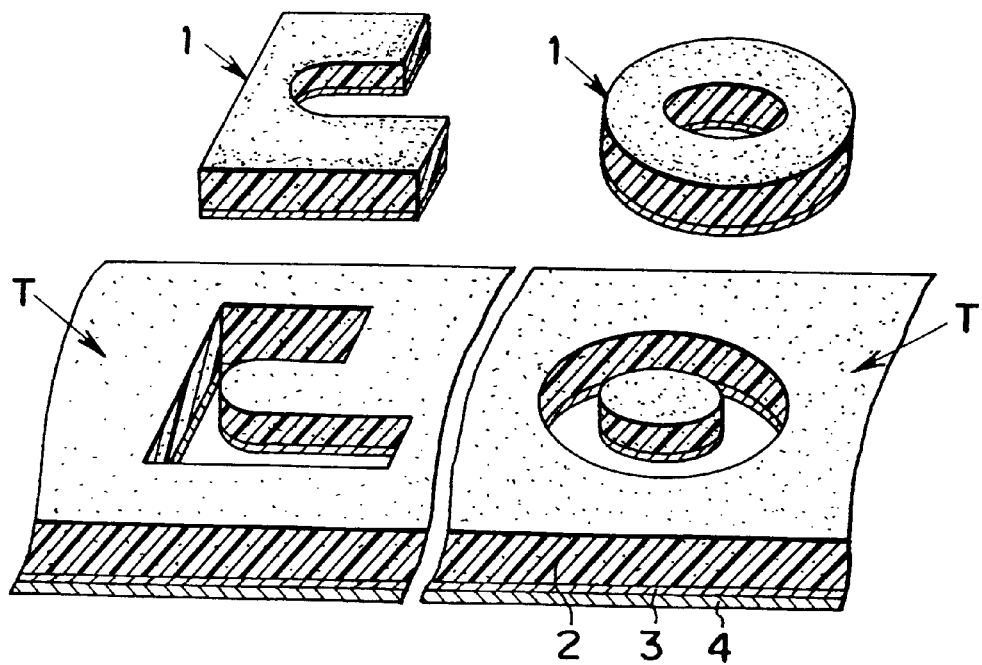
FIG. 2B is a perspective view of an outer appearance showing the way soft parts 1 having other profiles are cut from the sheet material 1.

In FIG. 1, reference numeral 100 denotes a supply reel on which a sheet material T shown in FIGS. 2A and 2B is wound.

In FIGS. 2A and 2B, this sheet material T is formed by adhering a soft member 2 such as urethane foam onto a release sheet 4 such as paper via an adhesive layer 3.

In this embodiment, the thickness of the release sheet 4 serving as a release sheet is 0.15 mm, the thickness of the adhesive layer 3 (double-coated tape) is 0.15 mm, and the thickness of the urethane foam of the soft member 2 in a natural state is 2 mm.

The width of the sheet material T is 12 mm, and the sheet material T is wound into a reel.

As the urethane foam, polyester-based urethane foam having a density of 114 kg/m$^3$ was used. Referring to FIGS. 2A and 2B, the cut shape is not limited to a rectangle and can be another profile or a circle as shown in FIG. 2B.

Referring back to FIG. 1, reference numeral 44 denotes an ultrasonic vibrator connected to an ultrasonic generator 6. The sheet material T supplied from the supply reel 100 is extracted by a driving roller 8A of a sheet driving unit 8 and extended on the upper surface of the vibrator 44 by an extending means 10 constituted by extension rollers 10A and 10B.

The dimensions of the upper surface of the ultrasonic vibrator 44 are 26 mm long×16 mm wide.

Reference numeral 12 denotes a cutting means primarily including a cutting blade 11 and a suction holding unit 17 f or holding the blade 11 and constituting a suction means.

Figure 3:
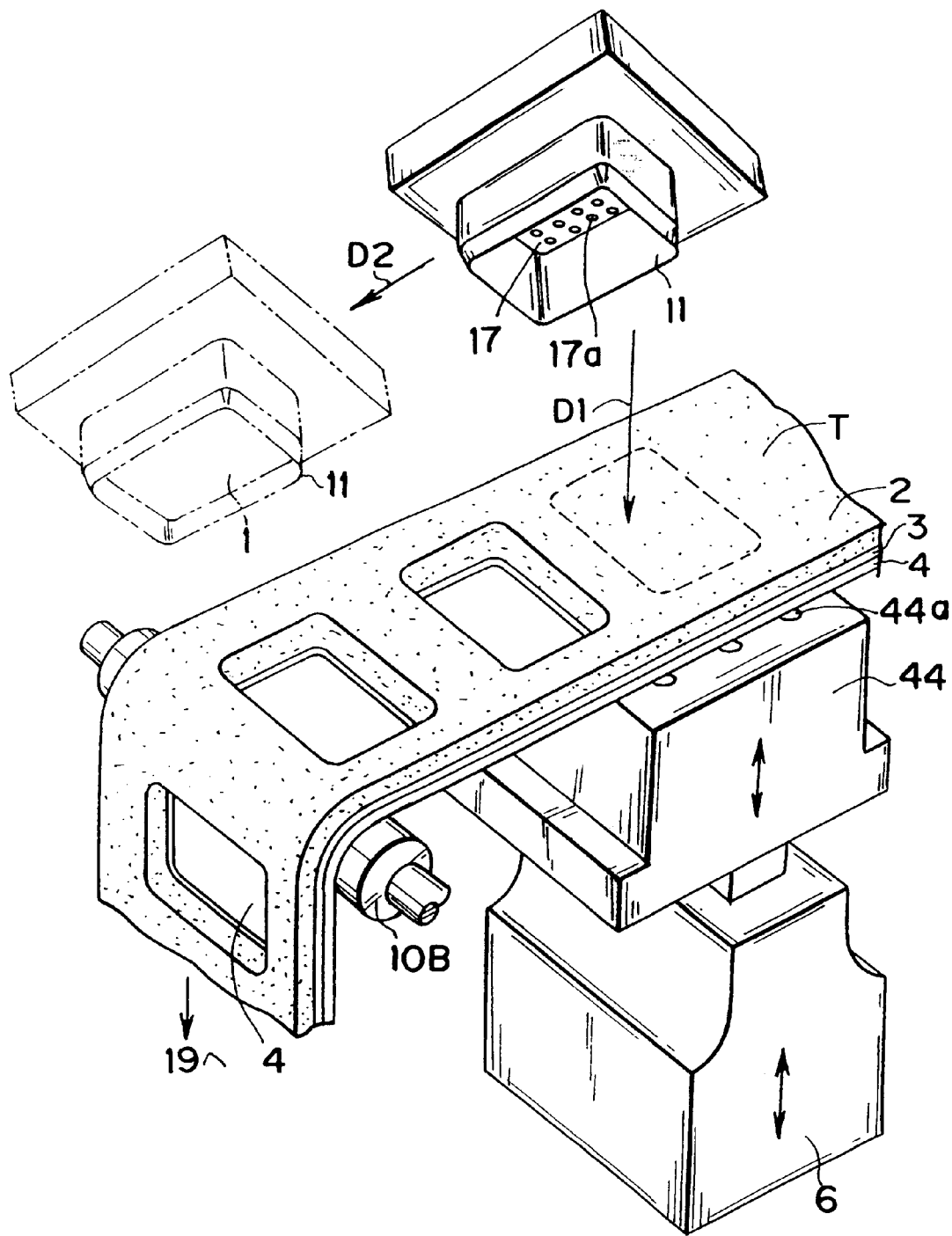
FIG. 3 is a view showing the cutting state.

FIG. 3 is a perspective view of the major components of the cutting blade 11 which has a so-called layered shape, a rectangular shape in this embodiment, corresponding to the cut shape of the soft member 2. A blade is formed in the peripheral portion of the rectangle, and the interior of the rectangle is hollowed out.

Reference numeral 1 in FIGS. 2A and 2B denotes the shape of urethane foam cut from the sheet material T by the blade 11.

Figure 4:
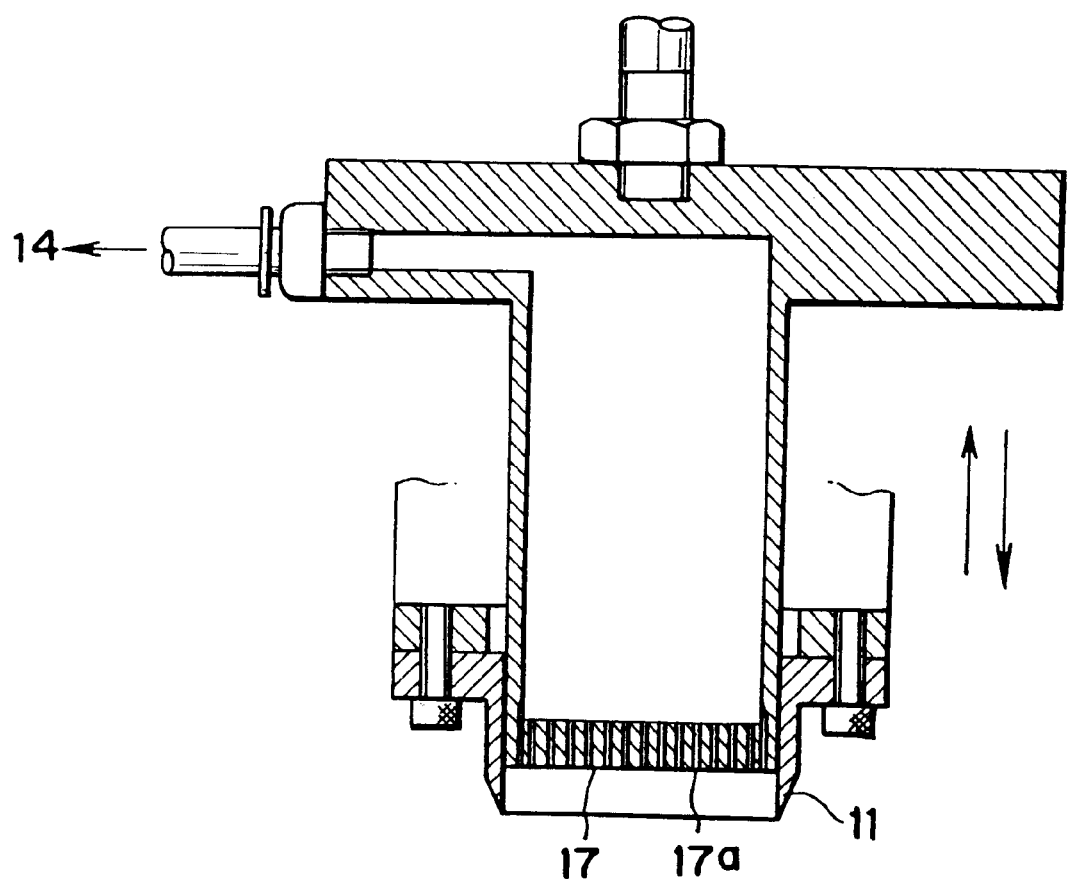
FIG. 4 is a sectional view of the main parts of a cutting blade 11 and a suction head 17.

As shown in FIG. 4, the suction holding unit 17 of the cutting means 12 is fitted inside the cutting blade 11, and a large number of suction holes 17a are formed to oppose the upper surface of urethane foam to be cut. Each suction hole is connected to a first suction unit 14. Reference numeral 20 denotes an arm of a biaxial orthogonal robot moving along the X and Y axes, and this arm 20 is driven by a control means (to be described later).

Figure 5:
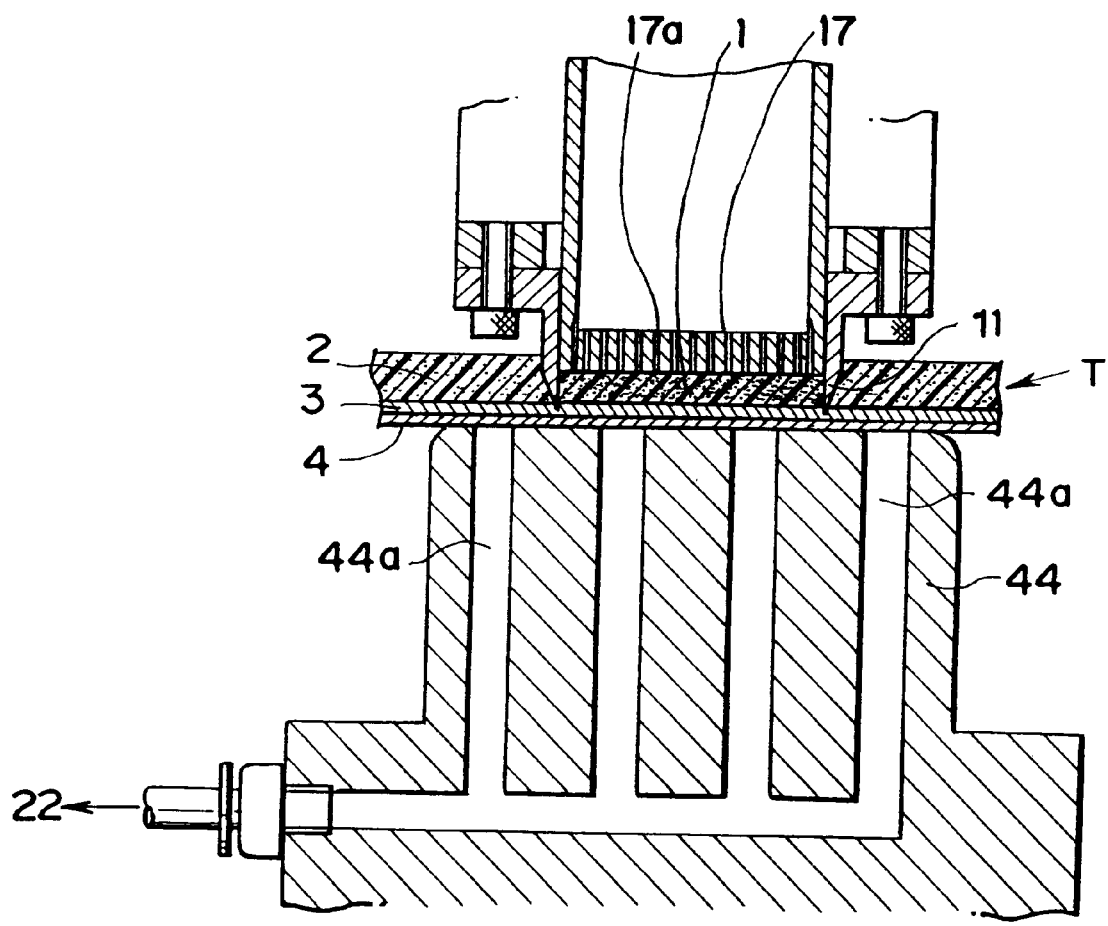
FIG. 5 is a sectional view of the main parts of the cutting blade 11, the suction head 17, and a suction unit 44.

A suction means is formed in the ultrasonic vibrator 44 to draw the sheet material T extended on the upper surface of the vibrator 44 to the upper surface by suction. As shown in FIG. 5, a plurality of suction holes 44a are formed in the longitudinal direction of the ultrasonic vibrator 44 and connected to a second suction unit 22.

Figure 6:
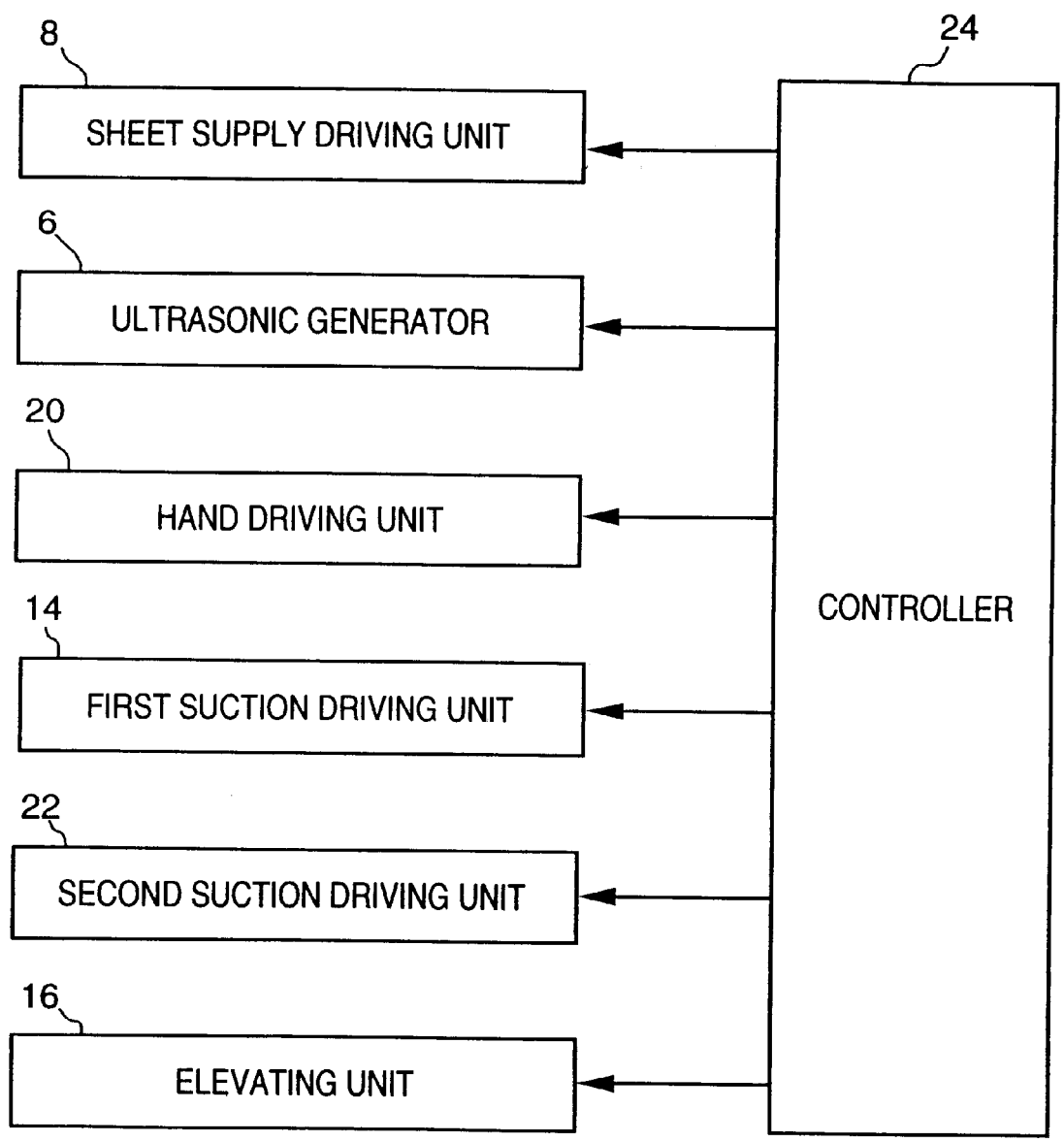
FIG. 6 is a block diagram of an apparatus.

FIG. 6 is a control block diagram for controlling the operation of each means. Each means described above is driven by a controller 24 serving as a control means.

Figure 7:
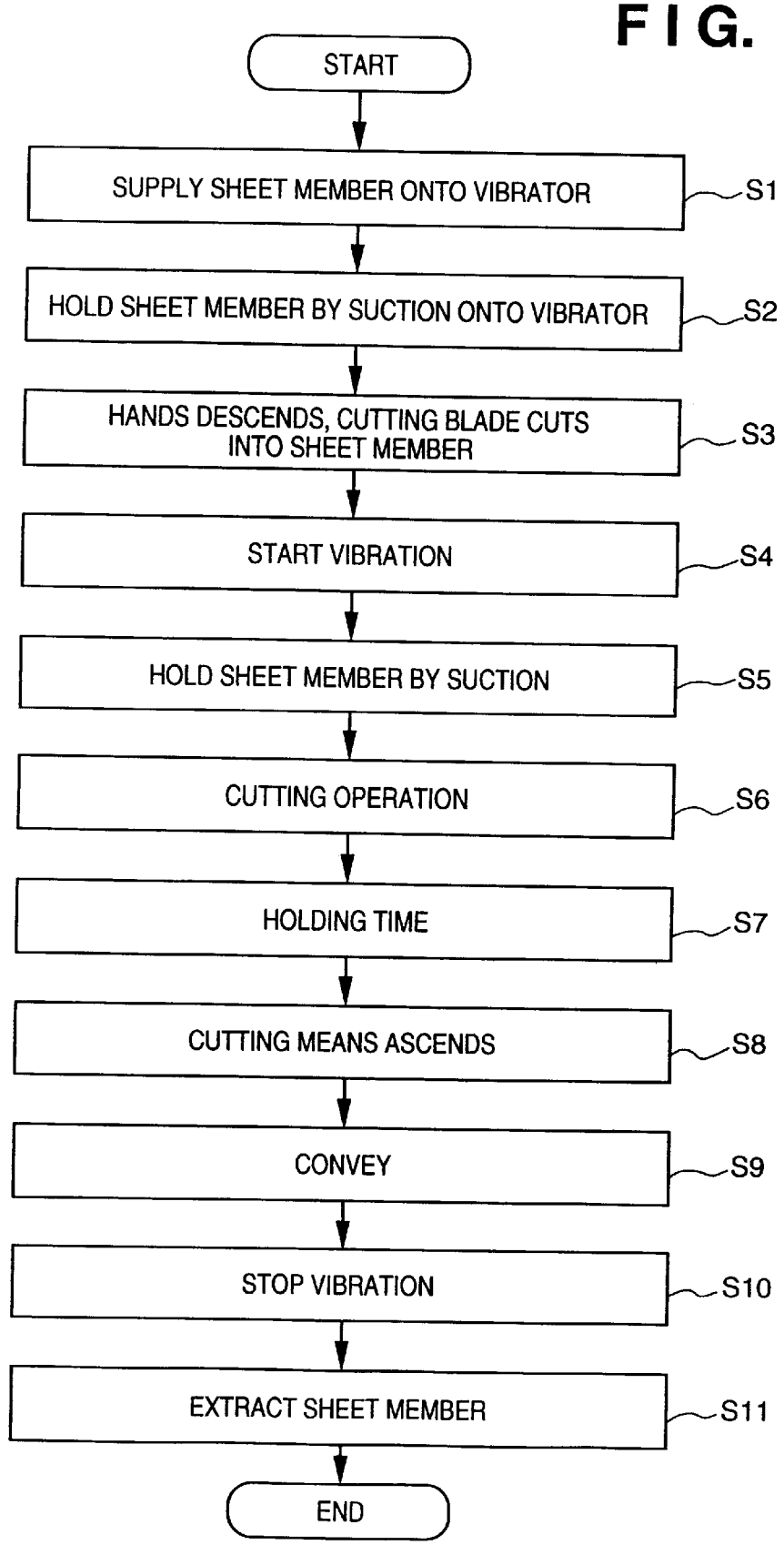
FIG. 7 is a flow chart for explaining operation.

The operation of the apparatus of this embodiment will be described below with reference to FIGS. 1 to 6 and a flow chart in FIG. 7 for explaining the operation.

In step S1, the controller 24 causes the supply driving unit 8 of an intermittent convey means to extract the sheet material T from the supply reel via the extending means 10 and the upper surface of the ultrasonic vibrator 44 and extend the sheet material T on the vibrator 44. When the sheet material T is completely extended, in step S2 the controller 24 causes the second suction driving unit 22 to start suction operation to allow the upper surface of the vibrator to hold the sheet material T on the vibrator by suction.

In step S3, the controller 24 moves the robot arm 20 downward. Consequently, the edge of the cutting blade 11 of the cutting means 12 starts cutting into urethane foam from its upper surface.

The descent of the cutting means stops at a preset descent stop position of the arm.

In step S4, subsequently to the stop of the descent of the arm the ultrasonic generator 6 operates and the vibrator 44 starts oscillating. As shown in FIG. 1, the vibrator 44 of this embodiment applies vibration at a vibration frequency of 28 kHz in the cutting direction of an object to be cut.

The flow advances to step S5, and the controller 24 operates the first suction driving unit 14 to draw the sheet material T upward by suction through the suction holes 17a in the suction head 17 of the cutting means 12.

Subsequently, as shown in FIG. 5, a piston of a pressurizing means 16 operated by a cylinder driving means moves the cutting blade 11 downward to a position where the edge of the cutting blade penetrates through an adhesive layer 3.

Next, in step S6, cutting operation is executed by the vibration of the vibrator, the start of each suction operation, and the descent of the cutting blade.

In the above cutting operation, the relationship between the density of the urethane foam of the soft member 2, the performance of the upward and downward suction operations, and a compression margin Δt of the urethane foam obtained by the robot arm shown in FIG. 5 has an influence on the cutting performance (e.g., whether the end portion is clearly cut or uncut portion is formed, or whether the end portion is vertically cut).

The data obtained by this embodiment were as follows.

| Urethane foam material (SM-110), density = 114 kg/m³ | |
| --- | --- |
| Performance of second suction driving means | |
| ultimate vacuum degree | −637 mmHg |
| maximum flow rate | 500 Nl/min |
| State of suction | |
| ultimate vacuum degree | −600 mmHg |
| estimated flow rate | 40 Nl/min |

| -continued | |
| --- | --- |
| Urethane foam material (SM-110), density = 114 kg/m³ | |
| Performance of first suction driving means | |
| ultimate vacuum degree | −690 mmHg |
| maximum flow rate | 37 Nl/min |
| State of suction | |
| ultimate vacuum degree | −650 mmHg |
| estimated flow rate | 40 Nl/min |
| Pressure during cutting | 20 to 30 kg |

In the cutting operation in step S6, as shown in FIG. 5, the edge of the cutting blade 11 cuts into the adhesive layer 3. When this cutting state is held for a predetermined time (in this embodiment, about 0.5 sec) (step S7), the cut side surfaces of the urethane foam soft member 2 and the adhesive layer 3 are closely adhered to the inner surfaces of the cutting blade 11. After the predetermined time elapses, in step S8 the controller 24 instructs the hand driving unit 20 to move the cutting means 12 upward. Consequently, the cut urethane foam and adhesive layer are separated (peeled) and moved upward while sticking to the inside of the cutting blade.

In step S10, the urethane foam cut and separated by the ascent of the cutting means 12 is conveyed to the position of the next pasting step by hand operation.

The suction operation and the vibration described above are stopped in synchronism with the timing of the ascent of the cutting means in step 8.

Subsequently, in step S11 the sheet supply unit 8 extracts a predetermined size of the sheet material T from the sheet supply reel.

Steps S1 to S11 described above are series of steps of cutting and separating the urethane foam.

In this embodiment, as shown in FIG. 5, the sheet material T to be cut is held by suction by the upper and lower suction means. However, it is also possible to operate the second suction means without operating the first suction means 14.

Also, in this embodiment shown in FIG. 5, the distribution density of suction holes in the first suction means was set to be higher than the distribution density of suction holes in the second suction means.

Actually, for cut areas L1=5.5 mm and L2=11 mm in FIG. 2, the diameter of the suction holes 17a of the first suction means was 0.6 mm, and the distribution density was 74 holes.

The diameter of the suction holes 44a of the second suction means was 2.0 mm, and the distribution density was 4 holes.

In the present invention as described above, in a method of cutting a sheet material made from an elastic member adhered onto a release sheet, the sheet material was extended on an ultrasonic vibrator and cut by a cutting means while the ultrasonic vibrator was vibrated. Consequently, end portions of a porous soft material containing air, such as urethane foam, could be clearly cut.

Also, the sheet material was cut by the cutting means while being drawn by suction by suction holes formed in the ultrasonic vibrator. Therefore, the cut dimensions could be accurately set.

Additionally, in a method of cutting a sheet material made from an elastic member adhered onto a release sheet, the sheet material was extended on an ultrasonic vibrator, the ultrasonic vibrator was vibrated, and a cutting pressure was applied by a cutting means. In this state, the sheet material was held by suction and cut by the cutting means. This improved the cutting accuracy.

Furthermore, in a method of cutting a sheet material formed by adhering an elastic member onto a release sheet via an adhesive layer, the sheet material was extended on an ultrasonic vibrator and, while the ultrasonic vibrator was vibrated, the sheet material was cut to a portion below the adhesive layer by a cutting means with a blade having a shape to be cut. Thereafter, the cut elastic member was separated from the release sheet by the ascent of the cutting means. Consequently, the cutting and the separation could be executed by single operation.

In the present invention, in a method of cutting a sheet material formed by adhering a porous member onto a release sheet via an adhesive layer, the release sheet and the elastic member were respectively held by suction by suction means, and the sheet material was cut by setting the suction force for the elastic member to be larger. This improved the stability of the cutting operation.

The present invention provided a cutting apparatus for a sheet material formed by adhering an elastic member onto a release sheet, in which the base member was extended on an ultrasonic vibrator by an extending means, the release sheet was held by suction on the ultrasonic vibrator by a suction holding means, and the sheet material was cut by a cutting means while the ultrasonic vibrator was applying vibration to the release sheet. Consequently, a cutting apparatus with high operability could be obtained.

This apparatus further comprised a second suction means for drawing the release sheet to the cutting means by suction when the cutting means descended for cutting. This further improved the accuracy.

The present invention also provided a cutting apparatus for a sheet material formed by adhering an elastic member onto a release sheet via an adhesive layer, comprising a means for extending the release sheet, a means for holding the release sheet by suction, a cutting means having a blade formed into a shape into which the elastic member was cut and separated, and a means for cutting the sheet material to a portion below the adhesive layer by pressing the cutting means and separating and holding the cut elastic member from the release sheet with the ascent of the cutting means. Consequently, it was possible to automate the cutting step, the separating step, and the conveying-pasting step.

In particular, in the present invention the cutting means 12 can cut with a small pressure loading because the cutting means 12 is moved down while ultrasonic vibration is applied.

This is a great merit in decreasing the size and weight of the driving source for generating the pressure loading and in miniaturizing the structure of the receiving mold of the cutting blade.

In this embodiment, a large pressure loading was required when cutting was executed by a method of applying no vibration. Consequently, the rigidity and strength design of the pressure receiving portion of the cutting means required improvements, resulting in a large complicated apparatus.

Furthermore, in the present invention, cutting operation obtained by the application of vibration and a shearing action by a low cutting pressure repetitively acted on a member to be cut. Accordingly, even if the thickness of the member to be cut was slightly large, the cut surfaces could be kept clean.

Also, while the ultrasonic vibrator was vibrated, the cut elastic member was separated from the release sheet with the ascent of the cutting means. Consequently, the cut portion could be stably separated from the release sheet.

In particular, longitudinal vibration of ultrasonic waves generated an air layer in the boundary between the release sheet and the adhesive layer. Consequently, the temperature of the adhesive layer rose to soften the adhesive layer, and this promoted the separation.

The second embodiment of the present invention will be described below.

An object of this embodiment is a sheet material continuously formed from a release sheet having at least a release layer on the surface and including continuously formed tack paper, and a soft member having an adhesive layer temporarily adhered to the release layer to finally adhere to an article.

Figure 8:
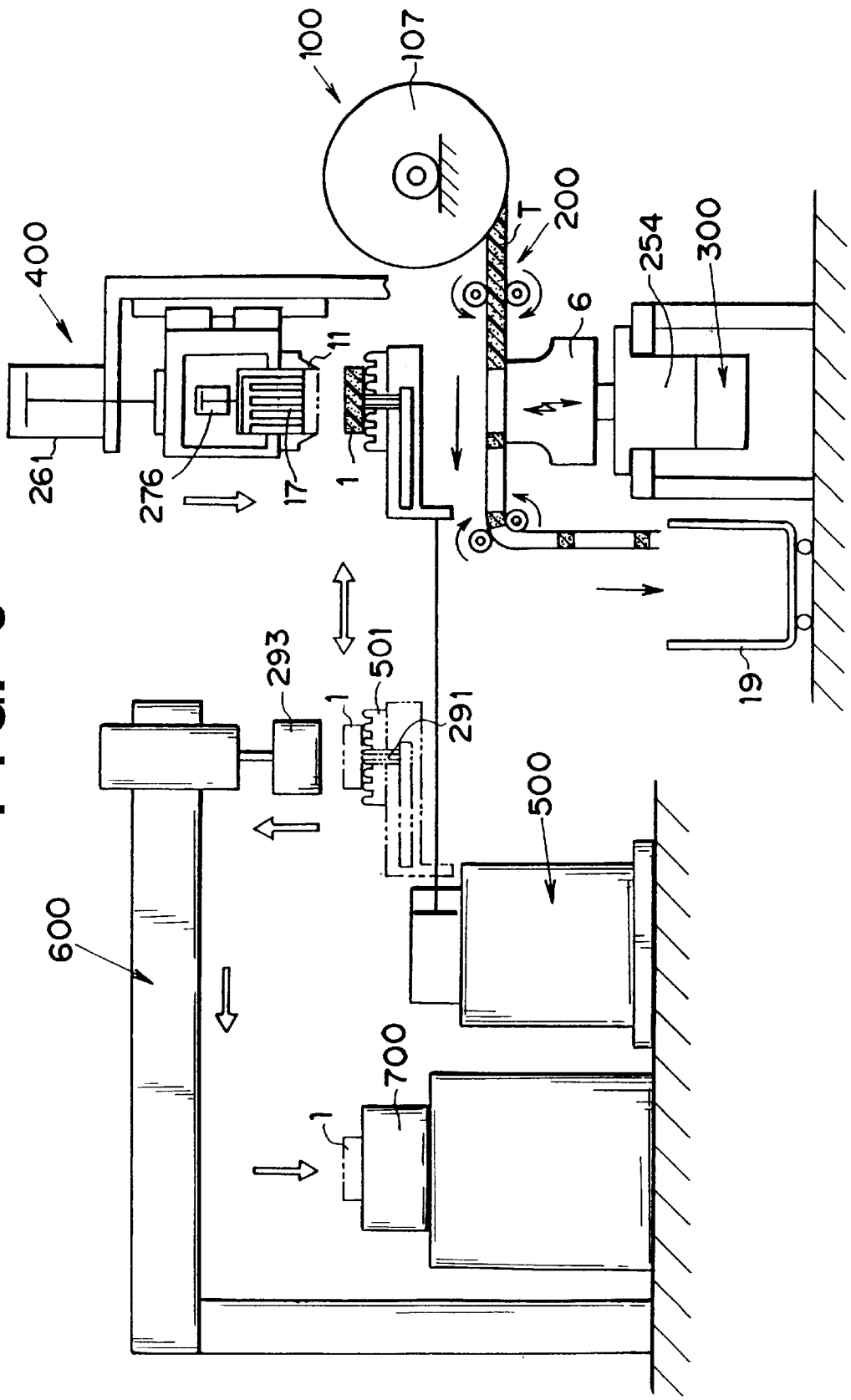
FIG. 8 is a schematic view showing the structure of the second embodiment of the present invention.

FIG. 8 is a schematic view showing the structure of an embodiment of a cutting separating mounting apparatus according to the present invention.

The apparatus of this embodiment comprises, along the feed direction of a sheet material T, a supply reel unit 100, a feed unit 200, an ultrasonic wave application device 300, cutting and separating units 11 and 17, a temporary table unit 500, and a pasting finger unit 600. The sheet material T wound in the form of a reel is set in the supply reel unit 100. The feed unit 200 extracts the sheet material T from the supply reel unit 100 and intermittently feeds the sheet material T pitch by pitch so that the sheet material T momentarily stops in the cutting unit. The ultrasonic wave application device 300 applies ultrasonic vibration to the sheet material T. The cutting and separating units 11 and 17 half-cut the sheet material T into a predetermined shape so that a release sheet 4 is left uncut, and separate a cut soft part 1 by suction from the release sheet 4. The temporary table unit 500 receives the soft part 1 from the cutting and separating units 11 and 17 and moves the soft part 1 to another position. The pasting finger unit 600 clamps the soft part 1 from the temporary table unit 500 and pastes the soft part 1 onto a predetermined work 700.

In this embodiment, the sheet material T is a porous soft material having a press ratio of 1 to ½. This sheet material T includes an adhesive layer, as a self-adhesive, made from a double-coated tape having high tack strength and the release sheet 4 formed as a cover tape on this double-coated tape.

The sheet material T is half-cut into a closed shape as shown in FIG. 3 by a cutting separating unit 400.

That is, a soft member 2 and an adhesive layer 3 made of a double-coated tape are cut into the shape shown in FIG. 3, whereas the release sheet 4 is left uncut although this shape can be slightly cut (marked) on the sheet.

A portion of the soft member 2 and the double-coated tape adhesive layer 3 of the sheet material T cut into the closed shape is the soft part 1 to be separated by suction by the cutting separating unit 400. A portion (outside the closed cut shape) of the soft member 2 and the double-coated tape adhesive layer 3 except for the soft part 1 is a waste material and dumped into a litter box 19.

Figure 9:
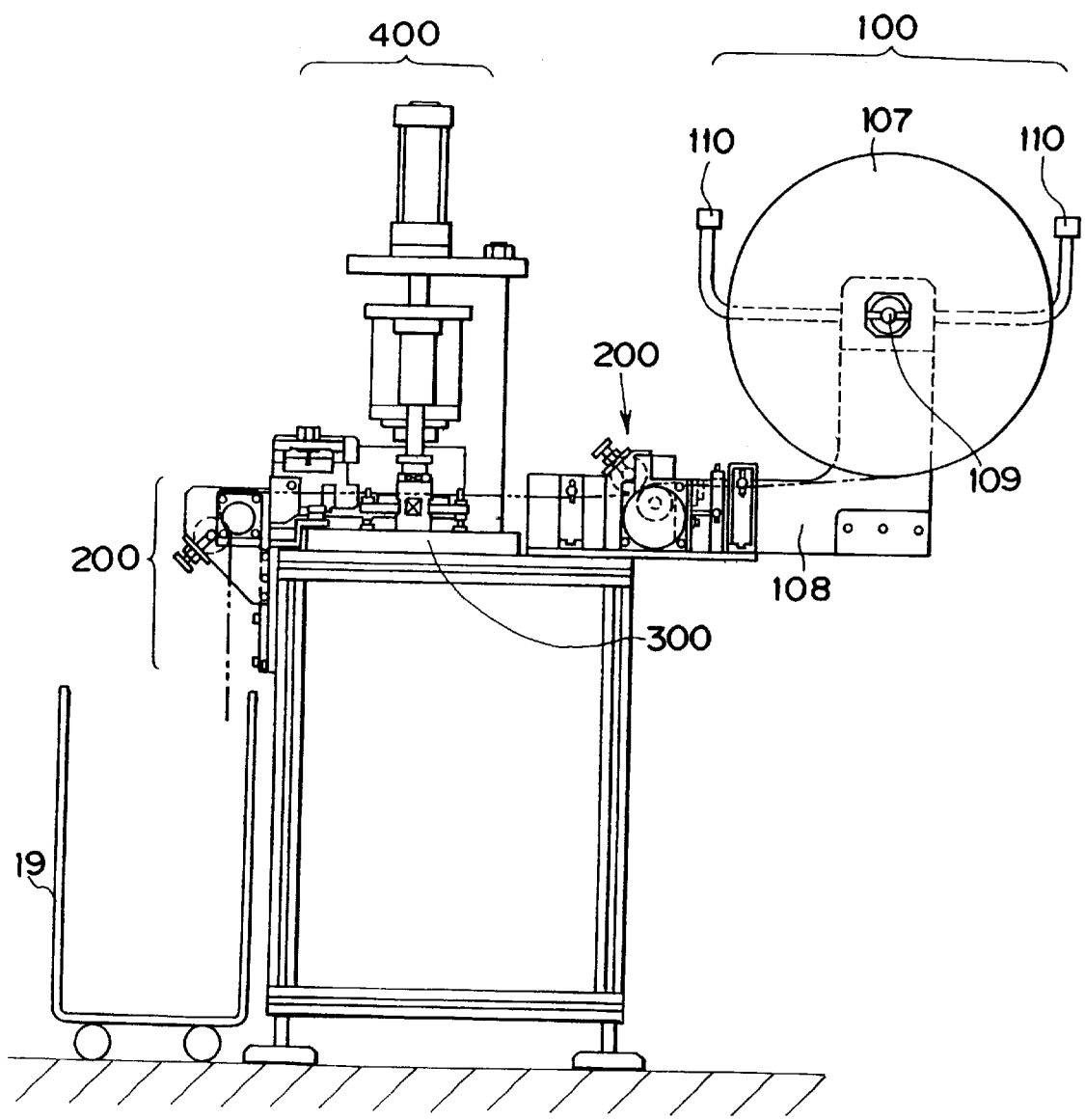
FIG. 9 is a front view of a feed unit 200 and a reel body 107.

FIG. 9 is a front view showing the arrangement of the reel unit 100 and the cutting separating unit 400.

Figure 10:
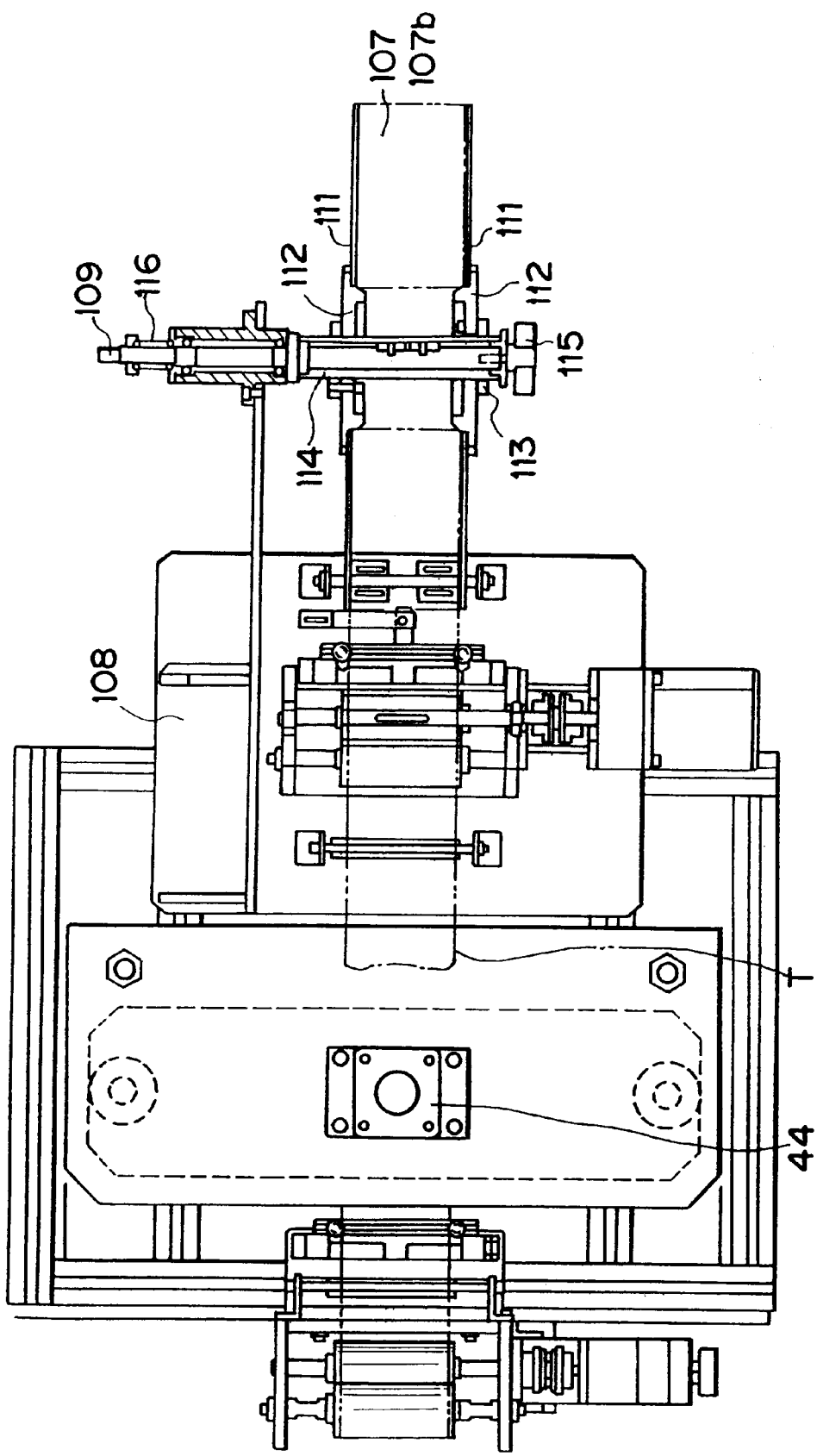
FIG. 10 is a plan view of the feed unit 200 and the reel body 107.

FIG. 10 is a plan view of FIG. 9. Referring to FIGS. 9 and 10, a reel body 107 on which the sheet material T is wound in the form of a reel is sandwiched between two reel frames 111 and set on a reel rotating shaft 109 rotatably supported by a reel base 108. A spring 116 incorporated behind the rotating shaft 109 applies back tension to the rotation of the reel body 107, thereby preventing over-run when the rotation is stopped.

When the residual amount of the reel body 107 is decreased to a certain amount or less by the operation of the apparatus, a residual amount sensor 110 installed in a position (not shown) where the sensor 110 senses a reduction in the outer shape of the reel body 107 operates and prompts an operator, by turning on a lamp (not shown) or the like means, to prepare for replacement to a new reel body 107b. This replacement to the new reel body 107b is performed (manually) following the procedure (a to e) described below in order that the operation be done without stopping the apparatus.

a) Another reel set (a set in which a new reel body 107b is sandwiched between two reel frames 111 different from those described above, two flanges 112, and two nuts 113 and assembled on a shaft 114) is prepared beforehand.

b) When the residual amount of the reel body 107 in use becomes a certain amount (an amount necessary during the reel replacement: usually about 1 to 2 m although it also depends upon the apparatus tact and the pitch feed amount in the feed unit 200), the sheet material T is loosened from the reel body 107, and the trailing end portion of the sheet is extracted to the rear portion of the apparatus.

c) The whole reel set in use (a set of two reel frames 111, two flanges 112, two nuts 113, and shaft 114 without the reel body 107 used) is removed by loosening a knob 115. The new reel set prepared in a) is assembled on the real rotating shaft 109 and fixed by fastening the knob 115.

d) The extracted trailing end portion of the reel body 107 in use and the leading end portion of the new reel body 107b prepared in a) are appropriately extracted and connected by, e.g., a tape.

e) A slack produced when the end portions are extracted to be connected is removed by rotating the new reel set.

The operation can be continued without being interrupted by performing the replacement following the above procedure.

Figure 11:
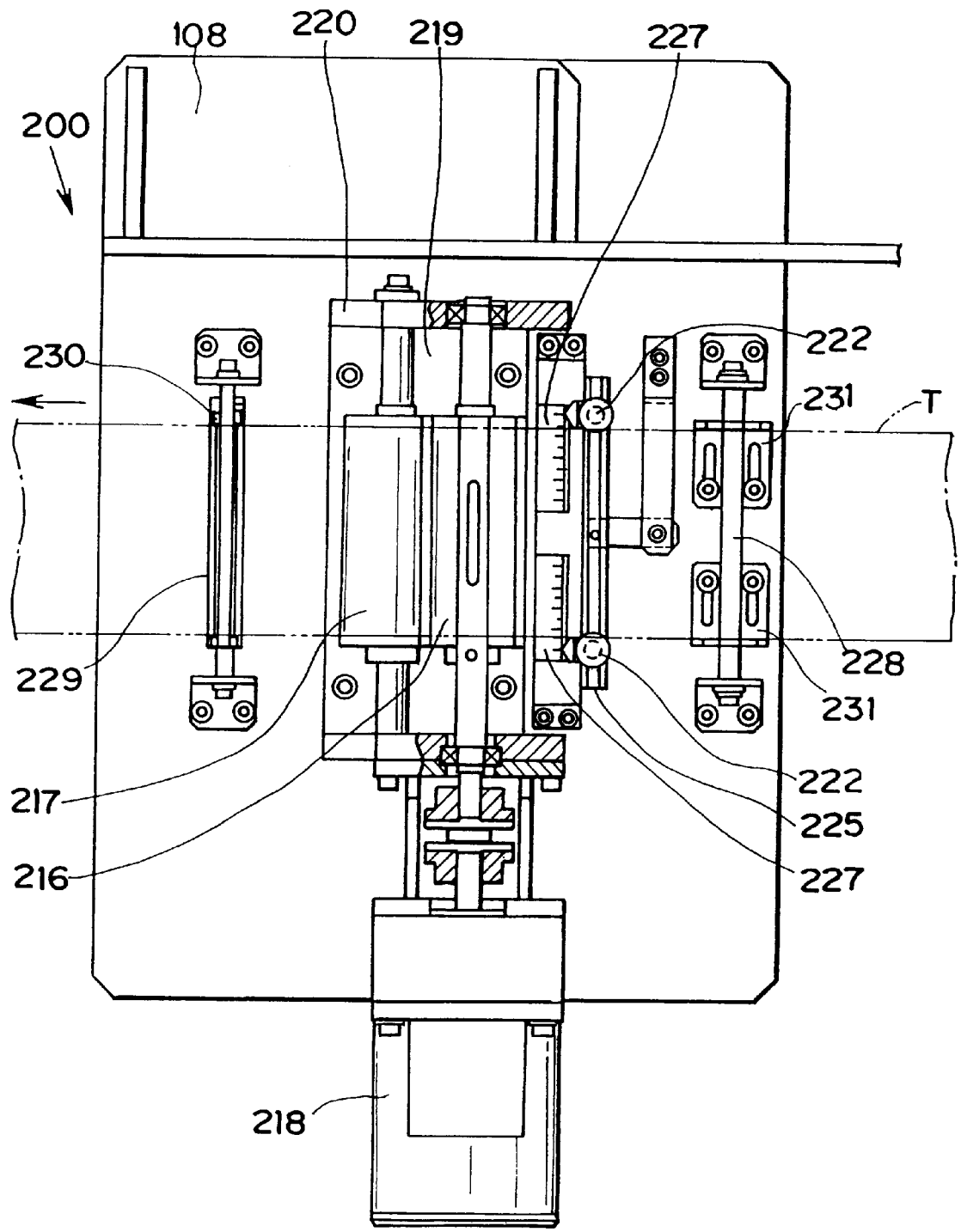
FIG. 11 is a plan view of the feed unit 200.
Figure 12:
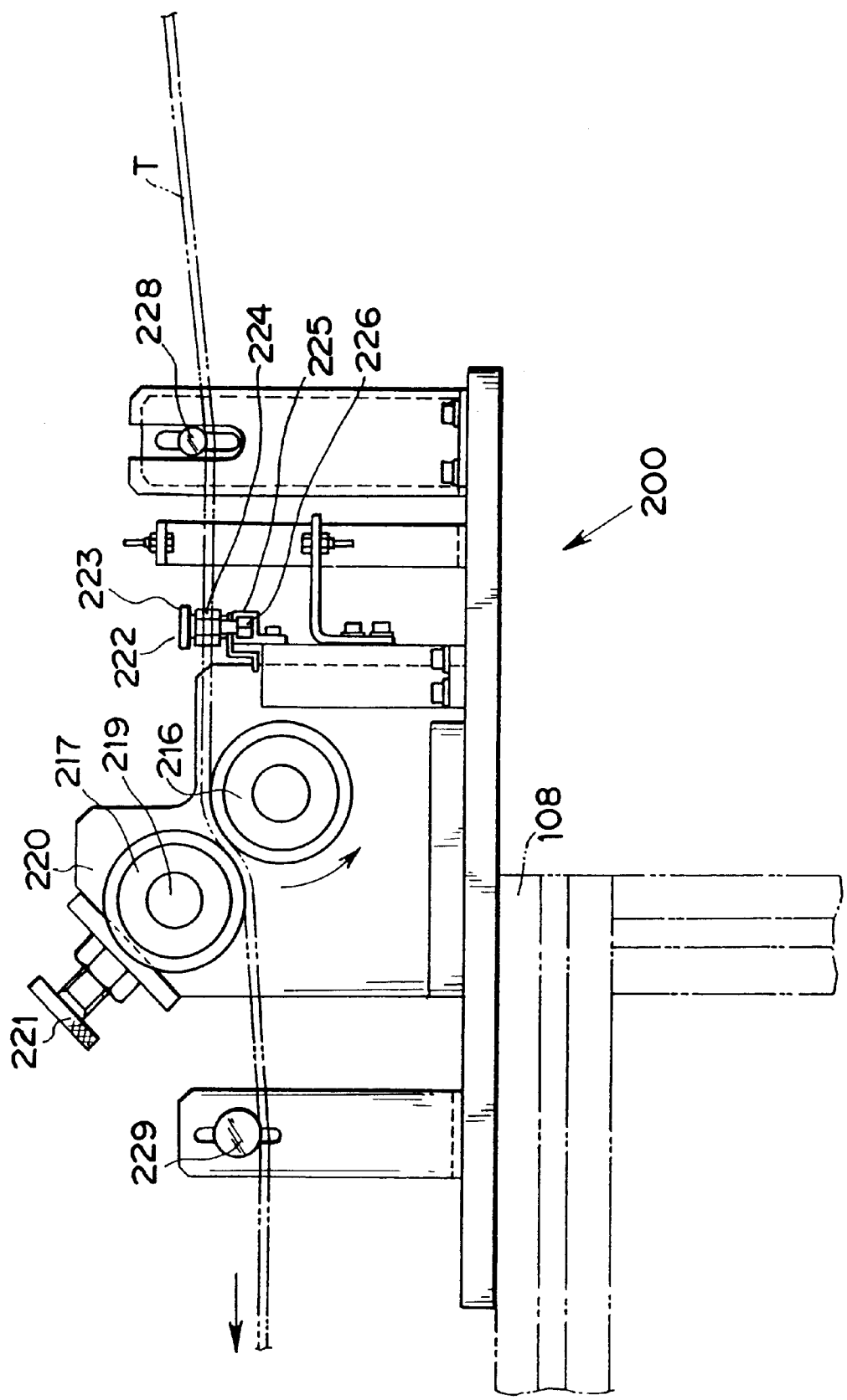
FIG. 12 is a front view of the feed unit 200.
Figure 13:
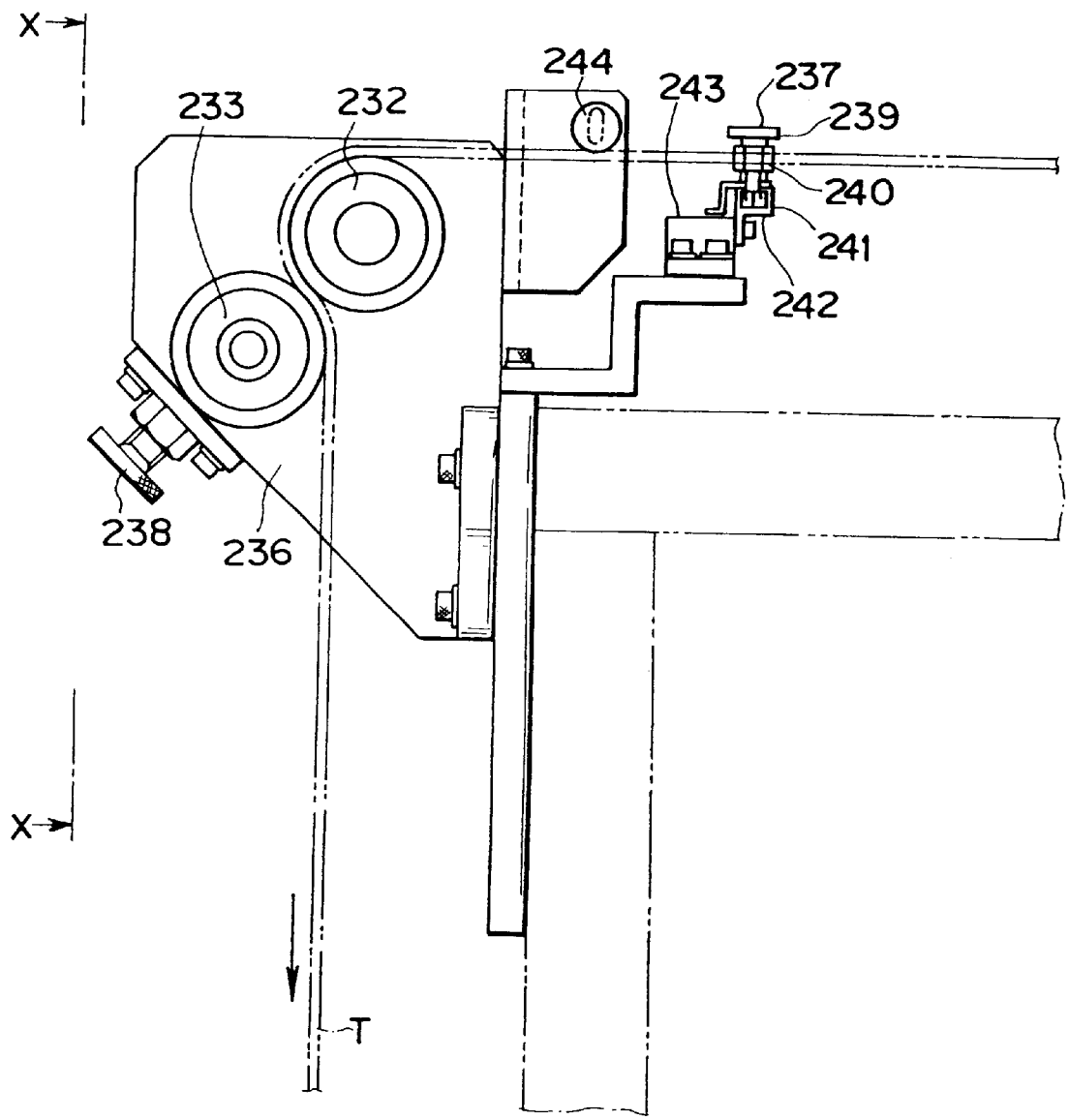
FIG. 13 is a plan view of the feed unit.

FIG. 11 is a plan view of the feed unit 200, FIG. 12 is a front view of the feed unit, and FIG. 13 is a front view of one side of the feed unit.

Referring to FIGS. 11 to 13, the feed unit 200 includes a tension unit for applying a proper tension to the sheet material T extracted from the supply reel unit 100, and a pitch feed unit for feeding a predetermined amount pitch by pitch. As shown in FIGS. 11 and 12, the tension unit sandwiches the sheet material T between a tension driving roller 216 and a tension driven roller 217, each having a rubber-coated outer circumferential surface, and compresses the sheet material T in the direction of thickness. A torque motor 218 connected to the driving roller 216 rotates in a direction (clockwise in FIG. 12) opposite to the feed direction of the soft part 1, thereby constantly applying a predetermined tension to the sheet material T.

A bearing (not shown) is incorporated between the inner circumferential surface of the driven roller 217 and a fixed roller shaft 219 and rotatably supports the driven roller 217. The roller shaft 219 is attached to plates 220 through elongated holes so that the attached position can be slightly adjusted.

Referring to FIG. 12, the compression in the direction of thickness of the sheet material T between the tension driving roller 216 and the tension driven roller 217 can be adjusted by pushing or pulling the roller shaft 219 by adjustment screws 221. That is, the d riven roller 217 is moved via the roller shaft 219 by the adjustment screws 221 arranged near the two end portions (now shown) of the roller shaft 219, thereby adjusting the compression amount in the thickness direction of the sheet material T.

Width-direction guide s 222 each including a shaft 223 and two bearings 224 are arranged at two ends in the width direction of the sheet material T.

This width-direction guide 222 functions as follows. That is, a screw portion fixed to a nut 226 inserted into the T groove of a T-groove rail 225 is loosened by turning the upper knob of the shaft 223, thereby sliding the width-direction guide 222 along the T groove of the T-groove rail 225. The attached position is adjusted on the basis of the scale of a scale 227.

A guide bar 228 is provided to correct any change in the extraction angle of the sheet material T between the reel unit 100 and the width-direction guides 222 caused when the outer shape of the reel body 107 is changed (gradually reduced) by the operation of the apparatus, so that the bearings 224 of the width-direction guides 222 are constantly in contact with the sheet material T. A pair of rough guides 231 are provided in positions corresponding to the two end portions in the width direction of the sheet material T in contact with the guide bar 228. These rough guides 231 substantially regulate the position in the width direction of the sheet material T extracted between the reel unit 100 and the width-direction guides 222.

A guide bar 229 is provided to adjust the vertical position of the sheet material T in the cutting separating unit 400, and adjusts the position by elongated holes in attached portions. Also, while the sheet material T is fed between the tension unit and the pitch feed unit (to be described below), variations in the tension amount must be suppressed in terms of the feed accuracy. In this embodiment, therefore, the guide bar 229 is rotatably supported by bearings 230.

Figure 14:
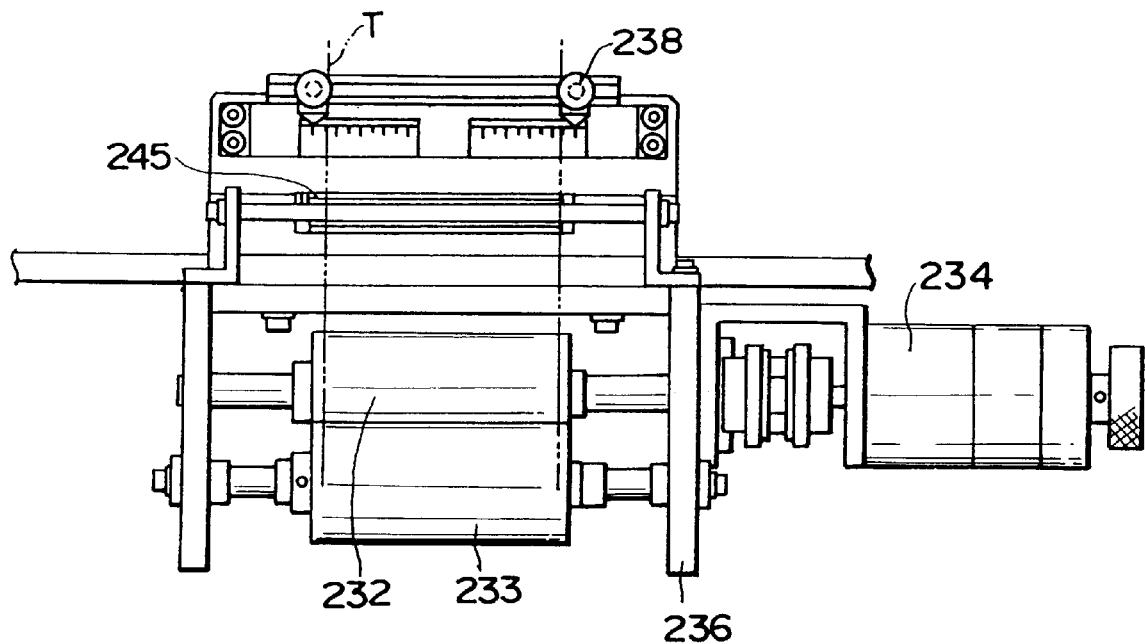
FIG. 14 is a view taken along a line X—X in FIG. 13.

The arrangement of the pitch feed mechanism is shown in a front view of FIG. 13 and FIG. 14 taken along a line X—X in FIG. 13. That is, the pitch feed mechanism sandwiches the sheet material T between a pitch feed driving roller 232 and a pitch feed driven roller 233, each having a rubber-coated outer circumferential surface, and compresses the sheet material T in the direction of thickness. A stepping motor 234 connected to the driving roller 232 rotates in the same direction (counterclockwise in FIG. 13) as the feed direction of the soft part 1, thereby feeding the sheet material T pitch by pitch by a predetermined amount.

The construction of the pitch feed mechanism is substantially the same as the tension unit described above. That is, a bearing (not shown) is incorporated between the inner circumferential surface of the driven roller 233 and a fixed roller shaft 233 and are rotatably supported. The roller shaft 233 is attached to plates 236 through elongated holes so that the attached position can be slightly adjusted. Also, the compression in the direction of thickness of the sheet material T between the tension driving roller 232 and the tension driven roller 233 can be adjusted.

This adjustment is accomplished by pushing or pulling the roller shaft 219 by adjustment screws 38 shown in FIG. 13. That is, the driven roller 233 is moved via the roller shaft 233 by the adjustment screws 38 arranged near the two end portions (now shown) of the roller shaft 233, thereby adjusting the compression amount in the thickness direction of the sheet material T.

Width-direction guides 238 each including a shaft 239 and two bearings 240 are arranged at two ends in the width direction of the sheet material T. This width-direction guide 238 functions as follows. That is, a screw portion fixed to a nut 242 inserted into the T groove of a T-groove rail 241 is loosened by turning the upper knob of the shaft 239, thereby sliding the width-direction guide 238 along the T groove of the T-groove rail 241. The attached position is adjusted on the basis of the scale of a scale 243.

A guide bar 244 is provided to adjust the vertical position of the sheet material T in the cutting-separating unit 400, and adjusts the position by elongated holes in attached portions. Also, while the sheet material T is fed between the tension unit and the pitch feed unit (to be described below), variations in the tension amount must be suppressed in terms of the feed accuracy. In this embodiment, therefore, the guide bar 244 is rotatably supported by bearings 245.

Figure 15:
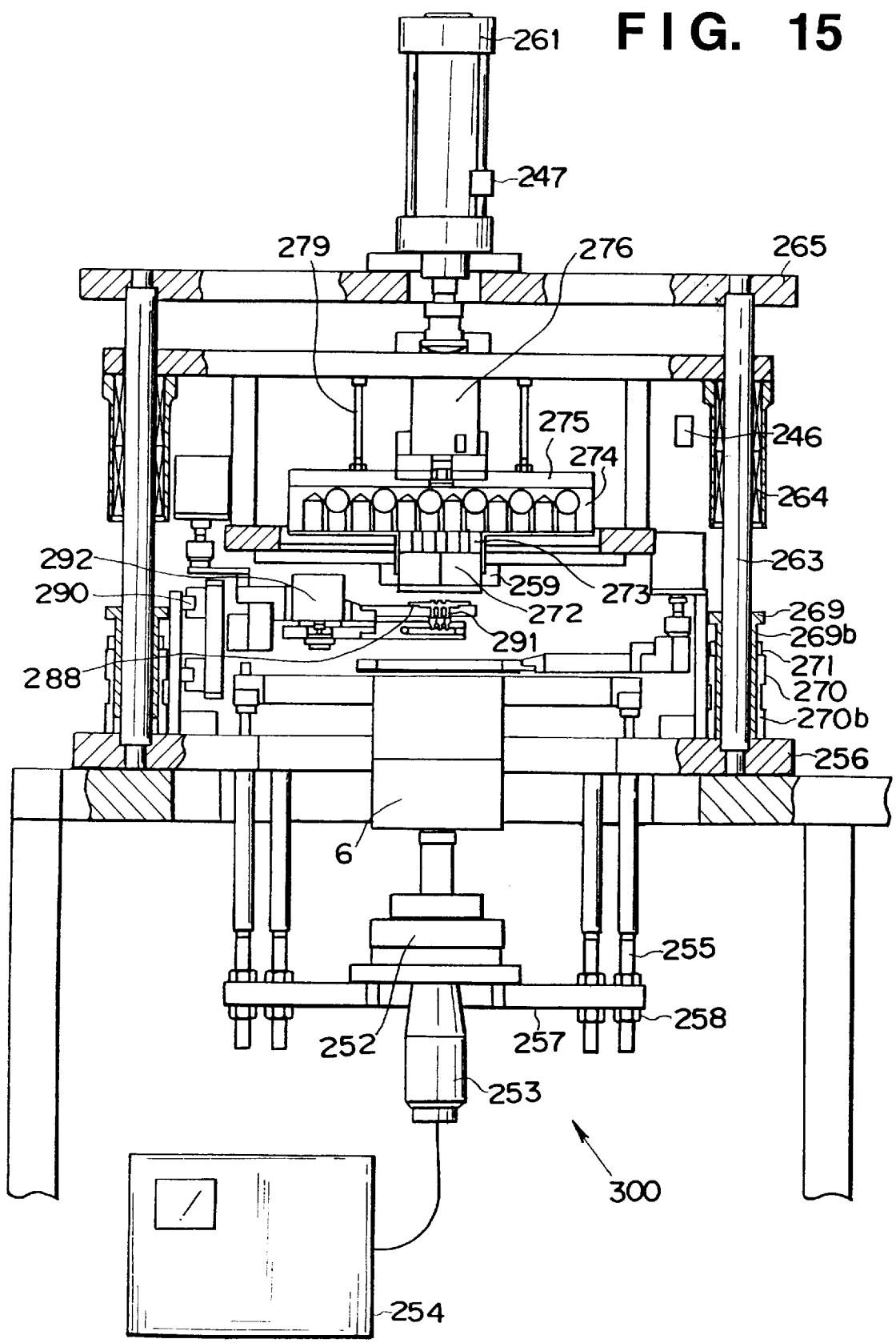
FIG. 15 is a detailed view of an ultrasonic wave application cutting separating unit.
Figure 16:
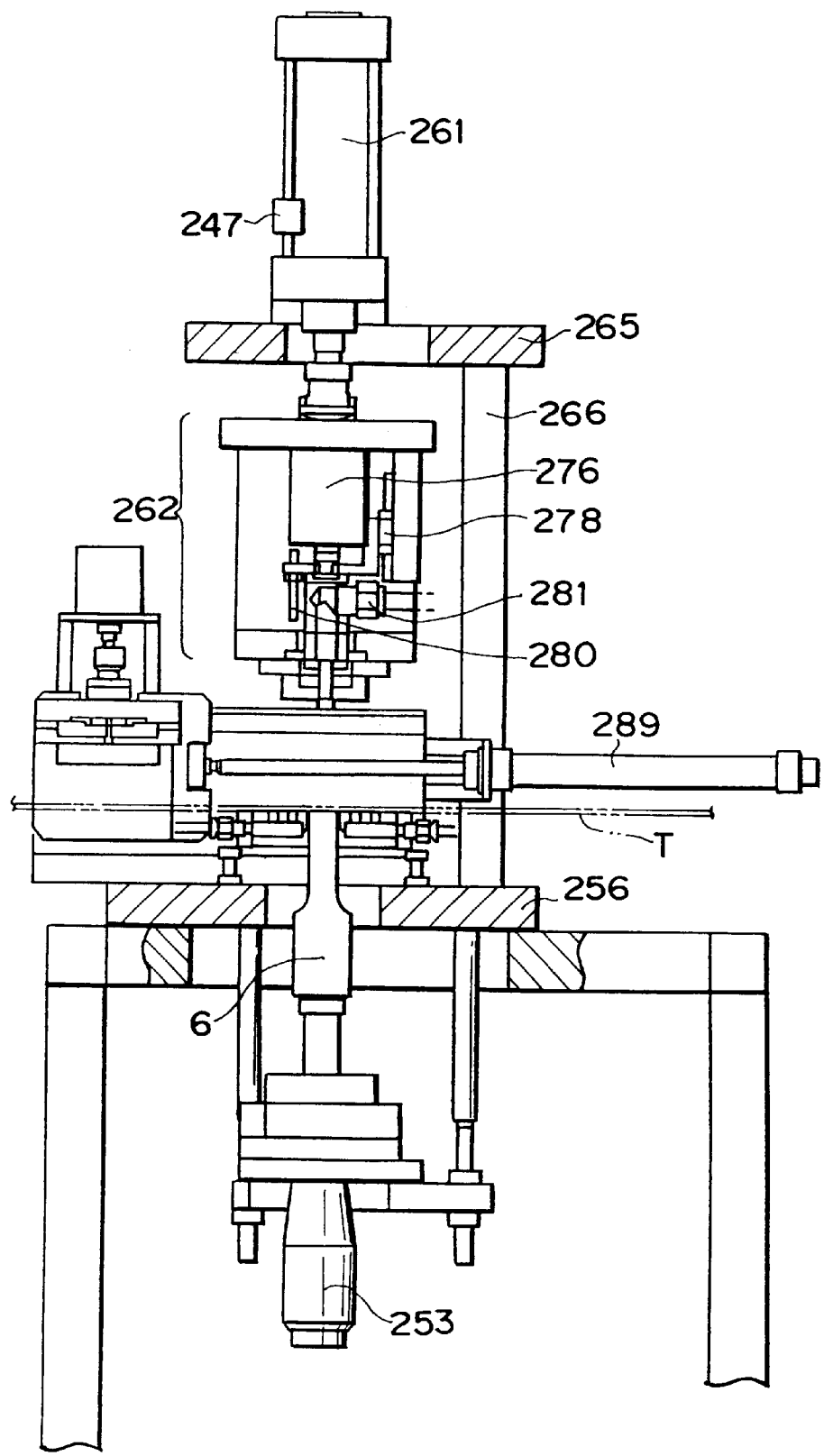
FIG. 16 is a detailed view of the ultrasonic wave application cutting separating unit.

FIG. 15 is a sectional view of the ultrasonic wave application device 300 viewed in a direction perpendicular to the conveyance direction of the sheet material. FIG. 16 is a front view of the ultrasonic wave application device 300.

Referring to FIGS. 15 and 16, in the ultrasonic wave application device 300 for applying longitudinal ultrasonic vibration at 10 to 20-odd kHz to the sheet material T, a set of a horn 6 having a flat end face and a common ultrasonic shaking unit (a set of a cone 252, an ultrasonic vibrator 253, and an ultrasonic generator 254) are mounted on a plate 257 and fixed to the lower surface of a base plate 256 by four screw bolts 255.

The position (height and inclination) of the flat end face of the horn 6 can be adjusted by moving the mounted position of the plate 257 by the four screw bolts 255 and nuts 258.

The ultrasonic generator 254 starts ultrasonic vibration by the horn 6 in accordance with a signal (ON) from a proximity switch 246 for detecting the descent of a cutting cylinder 261 of the cutting separating unit 400 (to be described later). The ultrasonic vibration by the horn 6 is stopped in accordance with a signal (OFF) from a descent end sensor 247 provided in the cutting cylinder 261 when the cutting cylinder 261 starts ascending, or by timer setting after the proximity switch 246 is switched on. Consequently, the sheet material T is constantly ultrasonically vibrated from the release sheet 4 side by the horn 6 during the time in which the cutting of the soft part 1 is started and its separation is complete.

In practice, it is very difficult to perfectly match the start and end of the sheet cutting separating operation with the timing of ultrasonic vibration. In this embodiment, therefore, the timings as described above are set such that the ultrasonic vibration time is minimized.

Figure 17:
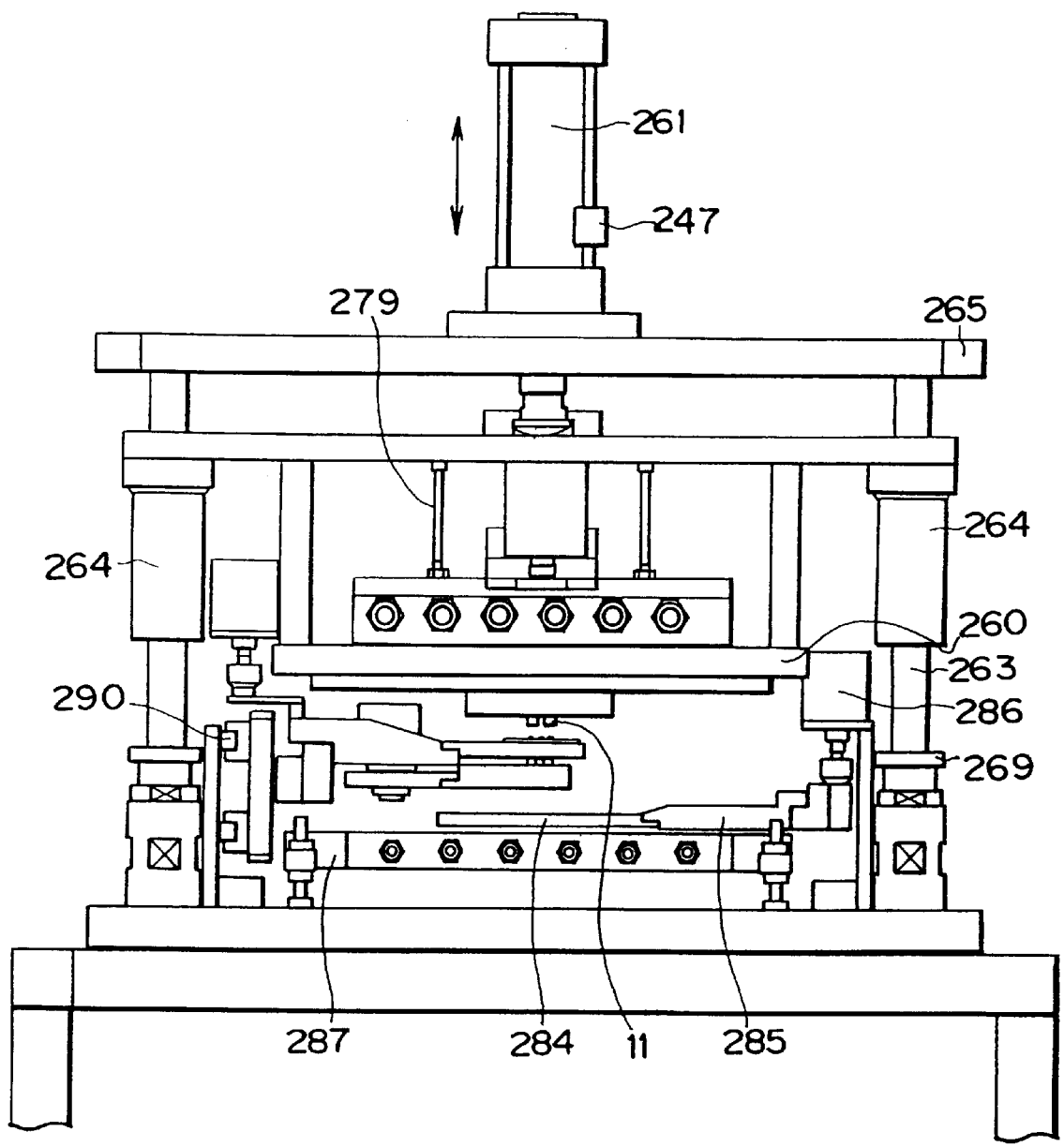
FIG. 17 is a detailed view of the ultrasonic wave application cutting separating unit.
Figure 18:
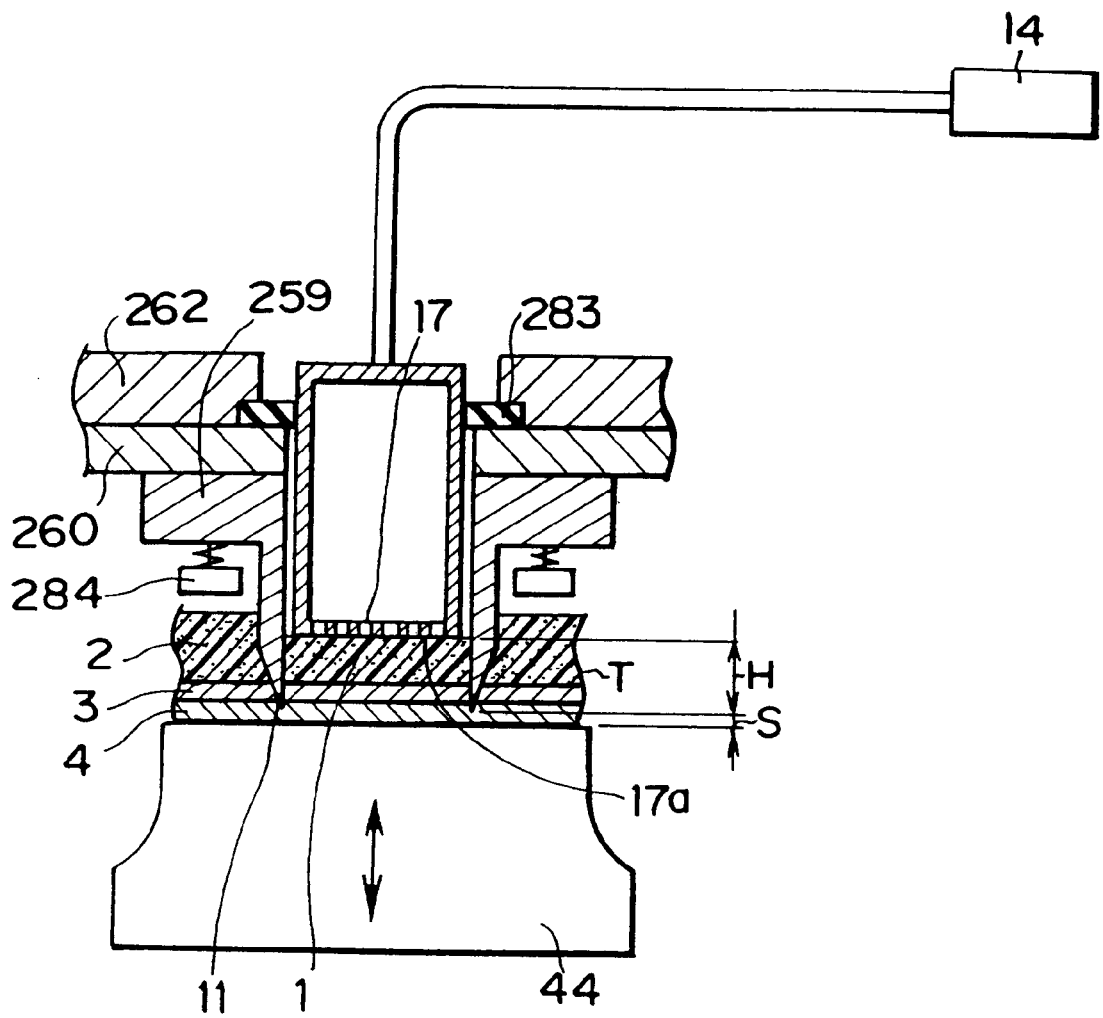
FIG. 18 is a view for explaining the operation of the ultrasonic wave application cutting-separating unit.

The arrangement of the cutting and suction units will be described below with reference to FIGS. 15, 16, 17, and 18. FIG. 17 is a sectional view showing the arrangement of the temporary table. FIG. 18 is a view for explaining the operation.

In FIG. 18, the sheet material T is half-cut into the shape of the soft material 1 by the cutting blade 11. The edge of the cutting blade 11 has the shape of the soft part 1, and a through hole having the shape of the soft part 1 is formed along the inner periphery (total periphery) of the blade. The cutting blade 11 is fixed to a plate 260 by positioning pins (not shown). The positioning pins are provided to reproduce the mounting position of the cutting blade 11 when the cutting blade 11 is removed or replaced due to troubles in durability, e.g., wear of the edge of the cutting blade 11, adhesion of a self-adhesive, or breakage of the cutting blade 11 caused by the biting of a foreign matter.

In FIG. 17, the plate 260 is fixed to a slide unit 262 which is vertically moved by the cutting cylinder 261 having a point of action concentric with the center of the cutting blade 11. The output from the cutting cylinder 261 is a few hundred kg, smaller than that of a common press apparatus. The slide plate 262 is guided by two shafts 263 and bushes 264. To prevent the operation of the cutting cylinder 261 from producing an eccentric load to the guide unit, the centers of the two shafts 263 are arranged in symmetrical positions on the same straight line about the center of the point of action of the cutting cylinder 261. A plate 265 for mounting the cutting cylinder 261 is mounted by a total of four shafts, i.e., the two shafts 263 and two fixing shafts 267.

Referring to FIG. 15, in the above arrangement the movement of the cutting blade 11 depends upon the vertical motion of the cutting cylinder 261. The upper end position of the movement is set by the upper end of the stroke of the cutting cylinder 261, and the lower end position is set by two stoppers 269 (the holder of the bush 264 descends with the descent of the cutting cylinder 261, and the lower end position is determined when the lower surface of the holder abuts against the upper surface of the stopper 269). The upper surface position (height) of the stopper 269 is adjusted by an external thread 269b formed in the inner circumferential surface of the cylinder of the stopper 269 and an internal screw 270b formed in the inner circumference of a spacer 271. After the adjustment, the stopper 269 is fastened and fixed by a nut. The gap and the parallelism between the edge of the cutting blade 11 and the upper surface of the horn 6 are finely adjusted by the screw adjustment of the stopper 269.

After the sheet material T is half-cut into the shape of the soft part 1 shown in FIG. 18 by the cutting unit, the soft part 1 is separated from the release sheet 4 by suction by a suction block 17 fitted with a fine gap (about 0.3 to 0.05 mm) in the inner periphery (the through hole having the shape of the soft part 1) of the cutting blade 11.

The double-coated tape self-adhesive layer sticking to the fine gap of the inner periphery of the cutting blade 11 due to the repetitive cutting operation is removed, each time cutting is performed, by the outer peripheral portion of the suction block 17 by eject operation (to be described later) which is a vertical motion of the suction block 17 and extracts the soft part 1 to the outside. As shown in FIG. 15, this suction block 17 is fixed to a manifold 274 and a plate 275 via a spacer 273.

The suction block 17 is vertically moved by an eject cylinder 276 and guided by a linear guide 278 mounted on the slide unit 262 of the cutting unit shown in FIG. 16. The ascent and descent ends of the stroke of the suction block 17 are finely adjusted by adjustment screws of upper and lower stoppers 279 and 280, respectively. Letting the initial thickness of the sheet material T be T1 and the thickness when the eject cylinder 276 descends and the soft part is compressed by the lower surface of the suction block be T2, the upper stopper 279 is so set that the compression ratio (T2/T1) falls within the range $1 \geq (T2/T1) \geq 1/10$. The proper value of the compression ratio changes in accordance with the press ratio (in this embodiment, 1 to ½) of the sheet material T used. If the press ratio is 1 (small), the compression ratio is increased (close to 1/10). If the press ratio is ½ (large), the compression ratio is decreased (close to 1). A large number of suction holes 17a about 1 mm in diameter are formed in the lower surface (the suction surface for the soft part 1) of the suction block 17. Suction air (negative pressure) is supplied to these suction holes 17a from a vacuum generator 282 connected to a pipe joint 281 attached to the manifold 274. A soft member 283 is provided to seal suction air leaking from the fine gap between the inner periphery of the cutting blade 11 and the suction block 17. In this embodiment, the soft member 283 is made from a resin material fitted on the outer periphery of the suction block 17.

A press unit is provided to stabilize the sheet material T without any floating or twisting when the sheet material T is cut by the cutting unit and to prevent the suction force of the suction block 17 from entirely or partially raising the release sheet 4 and a waste material remaining when the soft part 1 is separated by the separating unit. In FIG. 17, this press plate 284 has a notch slightly larger than the outer shape of the soft part 1 and is operated by a cylinder 286 via an arm 285.

The descent end position of the press plate 284 is set by an adjustment screw stopper (not shown) such that the gap between the lower surface of the press plate 284 and the upper plate of a receiving table 287 is substantially the same as the thickness of the sheet material T. A large number of suction holes are formed in the upper surface of the receiving table 287 to fix the release sheet 4 of the sheet material T by suction when air (negative pressure) is supplied from a vacuum source (not shown).

The arrangement of the temporary table unit 500 will be described below with reference to FIGS. 15, 16, and 17.

The cut and separated soft part 1 is fixed to the lower surface of the suction block 17 by suction when the cutting separating unit 400 ascends (when the cutting cylinder 261 and the eject cylinder 276 are in the ascent end position). The eject cylinder 276 descends on a soft part receiver 288 moved to a position below the cutting blade 11, and the suction by the suction block 17 is turned off to transfer the soft part 1. A plurality of projections are formed on the upper surface of the soft part receiver 288 to prevent the sticking of the double-coated tape on the lower surface of the soft part (to decrease the area in contact with the double-coated tape). The soft part receiver 288 is guided by a linear guide 290 and moved between a soft part transfer position and a waiting position by a moving cylinder 289. A hollow pin 291 for fixing the soft part 1 by suction is formed in a position substantially corresponding to the center of the soft part 1 transferred to the soft part receiver 288. The hollow pin 291 is so formed that the upper end of the hollow pin 291 is flush with the upper surface of the soft part receiver 288 in the ascent end position of a cylinder 292. The descent of the cylinder 292 is performed for escape operation by which the upper end of the hollow pin 291 moves away from the double-coated tape on the lower surface of the soft part.

Referring back to FIG. 8, the arrangement of the pasting finger unit 600 will be described. The soft part 1 placed on the temporary table unit 500 (waiting position) is separated by, e.g., suction chucking from the release sheet on the temporary table unit by a pasting finger 293, transferred by a biaxial orthogonal robot, and pasted on a predetermined work 700 held by a positioning means (not shown).

The operation of the apparatus with the above arrangement will be described below with reference to the schematic view in FIG. 8 and a timing chart in FIG. 19.

Figure 19:
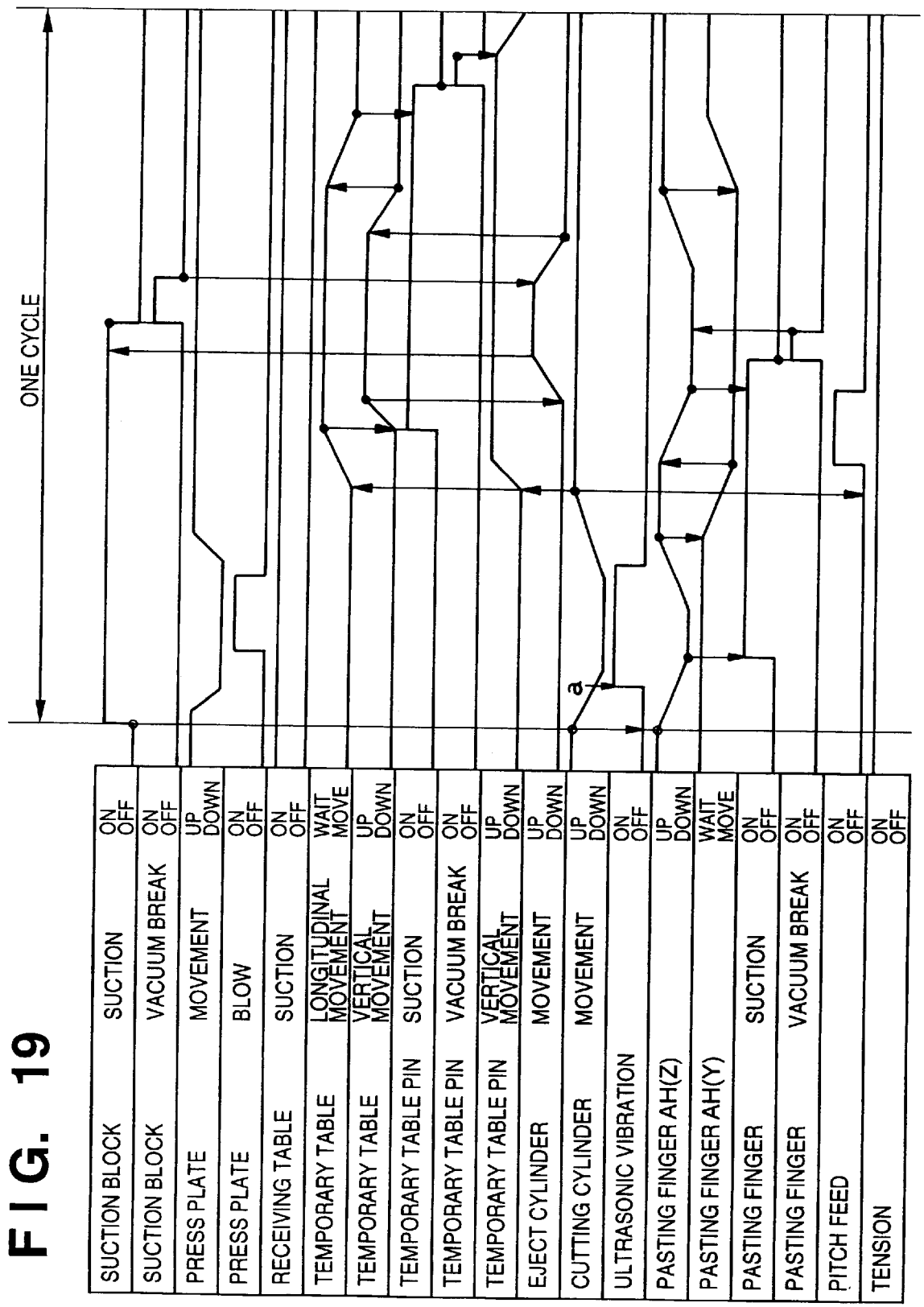
FIG. 19 is a sequence diagram for explaining the operation of the apparatus.

In FIG. 19, reference symbol "○" indicates a start signal of one cycle; "●", an operation completion signal; and "↑" or "↓", the start of the next operation upon reception of operation completion confirmation. Referring to FIG. 19, when the cutting cylinder 261 starts descending, the proximity switch 246 is switched on before (or at the same time) the cutting blade 11 comes in contact with the sheet material T. Upon receiving this signal, the ultrasonic generator 254 causes the horn 6 to start longitudinal ultrasonic vibration, and the sheet material T is vibrated from the side of the release sheet 4. (Reference symbol "a" in FIG. 19 denotes ON of the signal from the proximity switch 246).

Thereafter, the edge of the cutting blade 11 comes in contact with the ultrasonically shaken sheet material T, and the cutting cylinder 261 descends to start cutting the sheet material T. When the descent of the cutting cylinder 261 is stopped by the stopper 267, the soft part 1 is half-cut from the sheet material T while the release sheet 4 is left uncut.

The half-cut soft part 1 is separated from the release sheet 4 and drawn by suction to the lower surface of the suction block 17 by the suction force of the suction block 17 the suction by which is already started. (At this time the compression ratio of the soft part 1 is 1 to 0.2.)

When the soft part 1 is completely separated from the release sheet 4, the cutting cylinder 261 ascends, and the cylinder sensor 247 for sensing the descent end of the cutting cylinder 261 is turned off. Upon receiving this signal, the ultrasonic generator 254 is turned off to complete the longitudinal ultrasonic vibration by the horn 6. Since the cutting cylinder 261 ascends, the soft part 1 moves to the lower surface of the suction block 17 inside the cutting blade 11, thereby completing the cutting separating operation.

While the cutting cylinder 261 is in the descent end position during the cutting separating operation, the sheet material T is fixed by pressing by the work press plate 284 and suction by the receiving table 287.

The temporary table moves to a position below the cutting blade 11, the eject cylinder 276 descends, and the suction by the suction block 17 is turned off. Consequently, the cut and separated soft part 1 fixed by suction to the lower surface of the suction block 17 is transferred onto the soft part receiver 288.

Thereafter, the temporary table returns from the cutting position to the waiting position, and the pin 291 turns off the suction and descends to move away from the soft part 1. Subsequently, the pasting finger descends to chuck the soft part 1 on the soft part receiver 288 of the temporary table by suction. The pasting finger then ascends to move the soft part 1 to the pasting position and descends to paste the soft part 1 on the work 700.

Tension is constantly applied to the sheet material T. Also, the pitch feed is performed at the timing at which the cutting blade 11 is not in contact with the sheet material T.

Note that FIG. 19 shows the timings of one cycle in this embodiment. The operation of the pasting finger in FIG. 19 is for the soft part 1 cut in an immediately preceding cycle. (The cutting separating operation and the pasting finger operation are separated).

(Another Embodiment)

In the above embodiment, the lower surface (suction surface) of a suction block 17 is a flat surface in which a large number of suction holes are formed. If the tack strength of a double-coated tape is high, however, it is sometimes impossible to separate a soft part 1 from a release sheet 4 only by suction. In this embodiment, therefore, a means for helping separate the soft part 1 from the release sheet 4 is provided in addition to the suction by the suction block 17. This embodiment will be described below.

A plurality of needle projections having pointed tips are formed in positions, where these projections do not interfere with a large number of suction holes, on the lower surface (the flat suction surface in which the suction holes are formed) of the suction block 17. The height of this needle projection is so set that the tip of the projection does not contact the double-coated tape even when the soft part 1 is compressed during cutting and separation. A frictional force obtained by the piercing of this needle projection into a porous soft material functions as an auxiliary force for separation. These needle projections can be fixed needle projections embedded in the lower surface of the suction block 17.

Also, in order for the needle projections to obliquely pierce with respect to the direction of thickness of the soft part 1, movable projections may be set in the suction block 17. Alternatively, it is possible to form needle projection receiving holes in a cutting blade 11 and allow movable needle projections to pierce the soft part 1 from outside the cutting blade 11.

Figure 20:
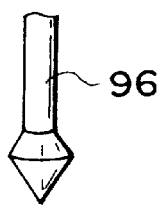
FIG. 20 is a front view of a dummy cutting blade 96.

Additionally, the tip of the needle projection can be formed to have the shape of an umbrella. That is, as shown in FIG. 20, the needle projection tip can be an umbrella needle 96 regardless of whether the needle projection is fixed or movable.

Figure 21A:
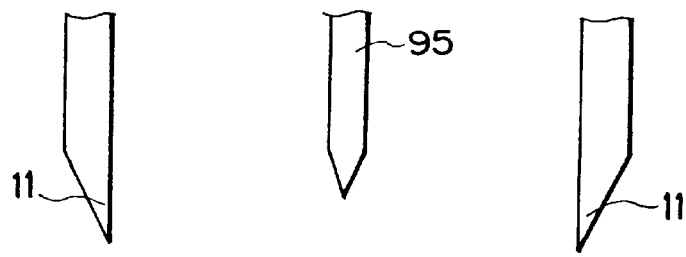
FIG. 21A is a front view of a cutting blade 11.
Figure 21B:
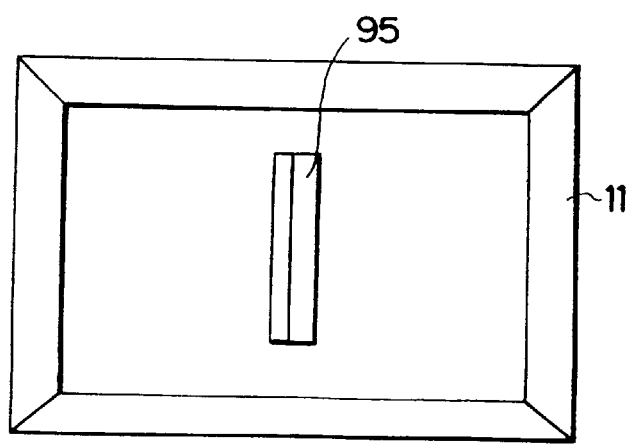
FIG. 21B is a plan view of the cutting blade 11.

Furthermore, as shown in FIGS. 21A and 21B, a dummy cutting blade 95 can be formed in a large-width portion of the soft part 1 inside the cutting blade 11. Similar to the needle projections, the frictional force of this dummy cutting blade functions as an auxiliary force for separation. To avoid the soft part 1 from being cut and separated by this dummy cutting blade 95, the height of the dummy cutting blade 95 is at least so set that the edge of the dummy cutting blade does not contact the double-coated tape even when the soft part 1 is compressed during cutting and separation.

Figure 22:
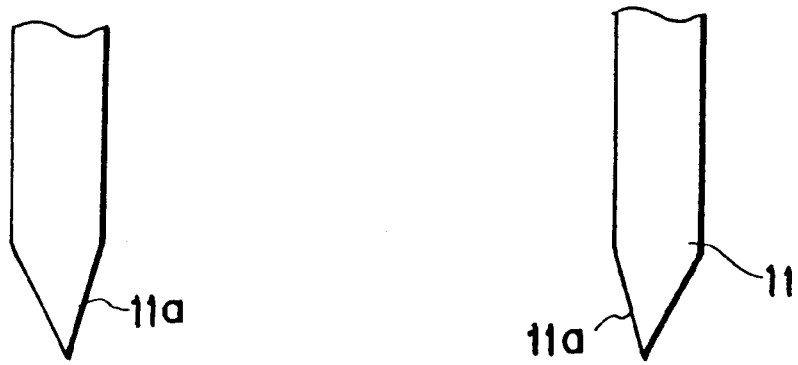
FIG. 22 is a front view of a cutting blade whose blade edge is angled.

Also, as shown in a sectional view of FIG. 22, the blade edge on the inner periphery of the cutting blade 11 can be angled. When the soft material 1 is compressed during cutting and separation, the outer peripheral portion of the soft part 1 is compressed by an oblique inner peripheral portion 11a of the cutting blade 11. This functions as an auxiliary force for separation.

Figure 23:
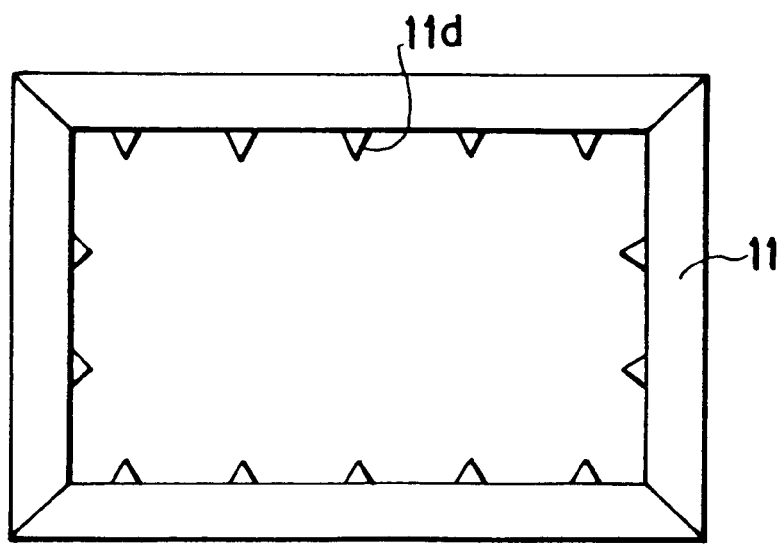
FIG. 23 is a cutting blade whose blade edge has steps 11d.

Moreover, as shown in a front view of FIG. 23, steps 11d can be formed in the direction of thickness on the inner periphery of the cutting blade 11. When the soft part 1 is compressed during cutting and separation, the outer peripheral portion of the soft part 1 is compressed by these steps 11d of the cutting blade 11. This also functions as an auxiliary force for separation.

If the thickness or the press ratio of the supplied sheet material T largely varies among lots or the like, the compression ratio cannot be held constant unless the dimensions with which the lower surface of the suction block 17 compresses the soft part 1 are appropriately changed. If it is necessary to set a very narrow allowable range for the compression ratio in order to keep the quality (requirements for, e.g., the cut shape and accuracy of the soft part 1), a means such as a lever-type thickness measuring unit is arranged between a reel unit 100 and a cutting-separating unit 500 to measure the thickness and press ratio of the supplied sheet material T in advance. Additionally, it is possible to replace an eject cylinder 276 with a numerically controlled type cylinder, omit a stopper 279, and change the ascent end position of the suction block 17 by feeding back the measurement data obtained by the measuring unit. Consequently, a fixed compression ratio can be constantly obtained even if the thickness or the press ratio of the sheet material T more or less changes.

As described above, the soft part 1 is cut by using ultrasonic vibration and the cut soft part 1 is directly separated in the cutting position. This decreases the press output required for the cutting and simplifies and miniaturizes the apparatus. Also, because the press output is low, the durability is improved in terms of wear and breakage of the cutting blade. It is possible to completely automate the sheet material cutting and separating steps which are conventionally manually performed.

Additionally, a series of units for supplying and pasting the soft part 1 including the pasting step after the soft part 1 is separated can be completely automated.

Also, the reliability and the productivity can be improved because the soft part 1 is reliably separated from the release sheet after being cut (the release properties are improved) and the shape and accuracy of the soft part 1 are improved. More specifically, it is possible to stabilize the shape and accuracy of the separated soft part 1 (prevent a change (crease, surface conditions) in the state of the cut and separated soft part 1 and improve the cut surface, cut shape, and transfer accuracy), improve the apparatus tact (tact up), and improve the operating efficiencies and the non-defective ratios of the apparatus, soft parts 1, and works on which soft parts 1 are pasted.

Figure 25A:
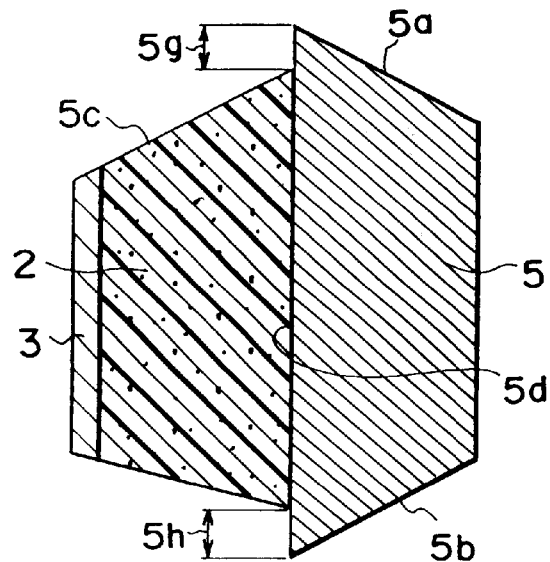
FIG. 25A is a side view of the sheet material having the protective layer 5 after the sheet material is cut before improved.

When a sheet formed by adhering a film serving as a protective layer on a porous soft material is cut, the protective layer film and the porous soft material deform to different degrees when compressed by the cutting blade. Consequently, as shown in FIG. 25A, the cut shape has offsets in portions (5g and 5h) along the edge line (boundary) of the protective layer, and cut surfaces (5a, 5b, 5c, and 5d) are obliquely formed.

4) Additionally, the self-adhesive which adheres the protective layer film onto the porous soft material is strong and extends from the end face of the projective layer in a portion of the edge line (boundary) of the protective layer or the cut surface of the projective layer film. When this portion is touched, the self-adhesive sticks or the soft part 1 adheres to a surrounding member.

Figure 24A:
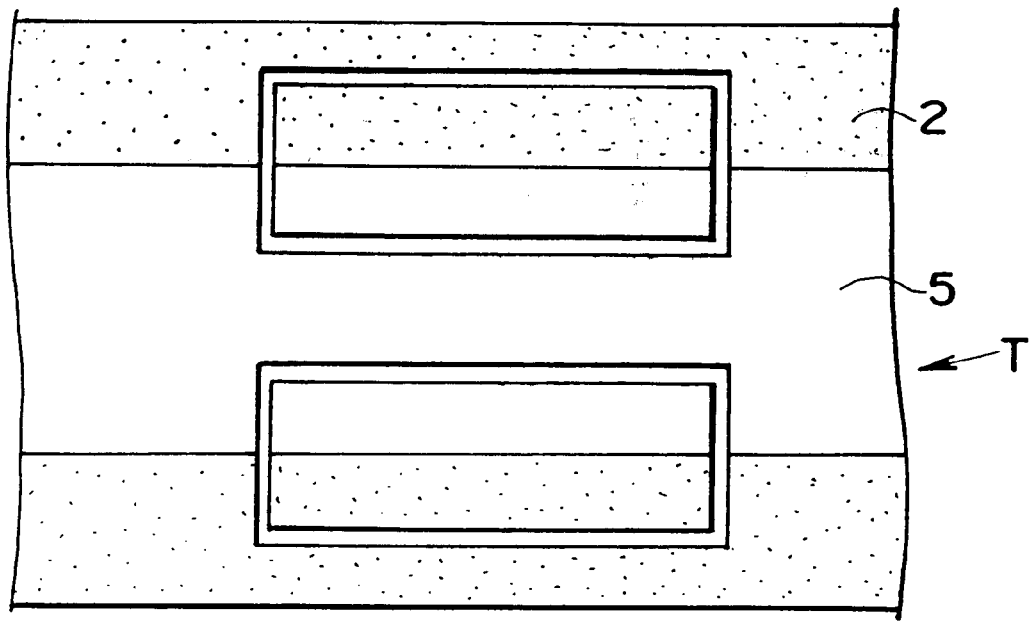
FIG. 24A is a plan view of a sheet material having a protective layer 5.
Figure 24B:
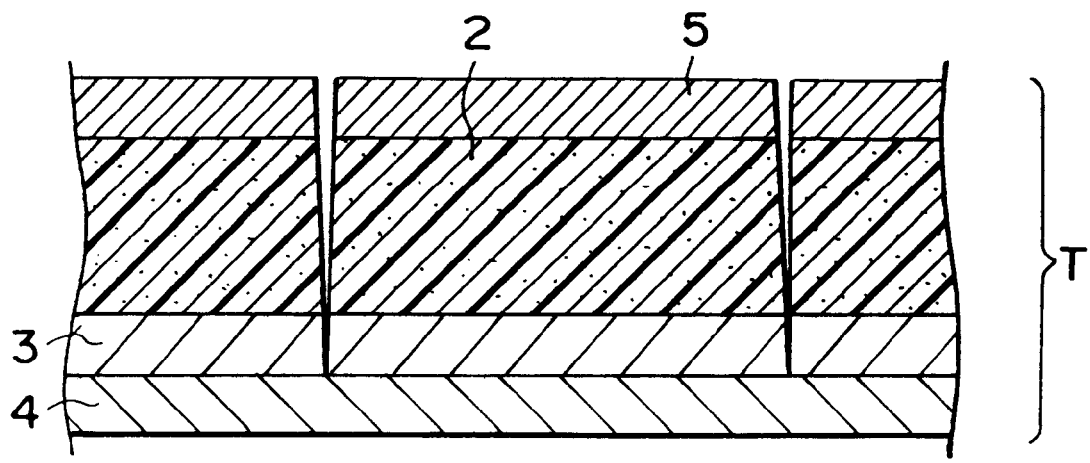
FIG. 24B is a side view of the sheet material having the protective layer 5.

5) Since the sheet is manually separated and pasted, (it is difficult to automate a series of steps of cutting→separation→pasting) Productivity is low→stabilization of quality and continuous operation and production are difficult Pasting accuracy is limited FIGS. 24A and 24B show a case in which when the soft part 1 is to be cut, not only a portion inside the cutting blade 11 but also a predetermined range of the outer peripheral portion of the soft part 1 are simultaneously compressed and cut. More specifically, when a sheet with film is cut, a film 5 serving as a protective layer and the porous soft material deform to different degrees when compressed by the cutting blade 11. Accordingly, when the cutting is done normally, the cut shape has offsets (5g and 5h in FIG. 25A) in portions along the edge line (boundary) of the film 5, and the cut surfaces are obliquely formed (5a, 5b, 5c, and 5d in FIG. 25A).

To prevent this, the whole portion (near the portion to be cut) of the sheet material T with film is compressed before being cut. This minimizes the deformation amount and prevents the cut shape from having offsets along the edge line (boundary) of the film 5 and the formation of oblique cut surfaces, thereby stabilizing the shape accuracy.

To this end, a fixed horn is arranged on the side of the release sheet 4 of the sheet material T, and a closed contoured cutting blade is arranged on the film side. This cutting blade has a means which can move in the direction of thickness (vertical direction) of the sheet and can stop at a predetermined position where the sheet is half-cut.

A suction block 17 movable in the thickness direction of the sheet material T is arranged inside this cutting blade. Also, a compressing means movable in the thickness direction of the sheet is provided in a portion of the sheet corresponding to the outer periphery of the cutting blade. When the cutting blade 11 descends, this compressing means compresses the outer peripheral portion of the soft part 1 to a predetermined thickness. The sheet half-cut by a suction means of the suction block is compressed to a predetermined thickness and drawn by suction by the suction surface of the suction block. In this state (with the sheet drawn by suction), the cutting blade 11 ascends to separate the half-cut sheet from the release sheet and move the cut sheet into the closed contoured cutting blade 11.

In this manner, the soft part 1 is drawn by suction, separated, and compressed by the suction surface of the suction block. Therefore, by forming a wall contacting the entire surface of the soft part 1 by increasing the total area of the suction holes, it is possible to improve the suction force and compress the soft part 1 to a uniform thickness.

Also, since the whole sheet (close to a portion to be cut) with film is compressed before being cut, the difference in deformation amount between the film 5 and the sheet material T is minimized when they are compressed by the cutting blade. This improves the cut shape (prevent offsets along the edge line (boundary) of the film 5 and the formation of oblique cut surfaces). Consequently, the cutting accuracy of the soft part 1 fell within the allowable range (about ±0.1 mm or less).

If the soft member of the sheet material T is a sponge-like member, the inner and outer compression ratios of the cutting blade must be set in accordance with the press ratio when cutting, suction, and separation are performed. Presumably, the compression ratio is further influenced by the time and timing of cutting separation, the specifications of ultrasonic vibration, and the material of the soft part 1. However, when the soft part 1 is made from a porous soft material and the range of press ratio is normal press to ½ press, the proper value of the compression ratio is set within the range of 1 to ⅒ in accordance with the press ratio of the porous soft material so that the positional accuracy and shape of the separated soft part 1 fall within the allowable ranges (the positional accuracy: about ±0.1 mm or less, the shape of the soft part 1: no crease and no changes in the thickness and the material surface state).

Figure 25B:
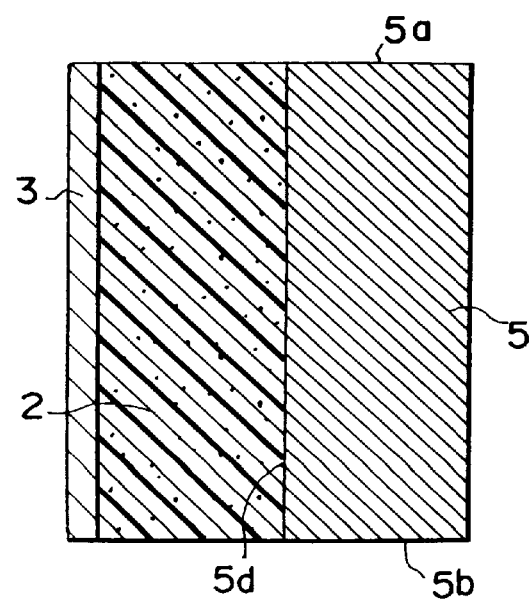
FIG. 25B is a side view of the sheet material having the protective layer 5 after the sheet material is cut before improved.

A strong self-adhesive which adheres the film 5 described above to a porous soft material 2 extends to the cut surfaces 5a, 5b, and 5c and the end face 5d of the protective layer film on the upper surface of the soft part 1 shown in FIGS. 25A and 25B. Therefore, as shown in FIG. 26, notches 95a and 95b are formed in the lower surface (the suction surface for the soft part 1) of the suction block 17 so as not to touch the extended portions (5a to 5d) of the self-adhesive.

When cutting is performed in the first embodiment, the lower surface (suction surface) of the suction block 17 waits in a position a dimension H back from the edge of the cutting blade 11. When a press plate 284 descends and the cutting blade 11 descends in this state, the sheet material T with film is compressed in the order of (1) to (4) below in a strict sense.

(1) A cylinder 286 moves to the descent end position, and the lower surface of the press plate 284 compresses the outer peripheral portion of the sheet material T with film to be cut.

(2) A cutting cylinder 261 descends to allow the edge of the cutting blade 11 to contact and start cutting the sheet material T with film.

(3) The lower surface of the suction block 17 comes in contact with the sheet material T with film and starts compressing the cut portion.

(4) The cutting cylinder 261 stops at the descent end position to complete the cutting and the compression of the cut portion by the lower surface of the suction block 17.

More specifically, the whole inner and outer portions of the cut portion of the sheet material T having a film serving as a protective layer are not uniformly compressed before being cut. The operation is performed as above because the operating times between steps (1) to (4) described above are very short and does not impose any problem in practice.

If, however, it is necessary to lower the descent speed of the cutting cylinder 261 (to reduce, e.g., noise or impact), no uniform compression can be performed by the above operation. If this is the case, the operation is done as follows.

(1) A position where the lower surface of the suction block 17 is on the same level as or protrudes by a predetermined amount from the edge of the cutting blade 11 is set as a waiting position.

(2) The cylinder 286 moves to the descent end position, and the lower surface of the press plate 284 compresses an outer peripheral portion of the sheet material T with film to be cut. Simultaneously, the lower surface of the suction block 17 comes in contact with the sheet material T with film and starts compressing the sheet material T.

(3) The cutting cylinder 261 descends to allow the edge of the cutting blade 11 to contact and start cutting the sheet material T with film.

(4) The cutting cylinder 261 stops at the descent end position to complete the cutting.

In this operation, after the suction block 17 completes the descent for compression, the cutting cylinder 261 descends to perform cutting. Therefore, a moving cylinder (=an eject cylinder 76) of the suction block 17 is fixed by a pasting portion independently of the operation of the cutting cylinder 261. Alternatively, the stroke from the descent end position of the suction block 17 to the descent end position of the cutting cylinder 261 is absorbed by, e.g., cushion.

The outer shapes of driven rollers 217 and 233 of the tension unit and the pitch feed unit for the sheet material T with protective layer are cylindrical shapes. A recess (notch) is formed in a portion of each of these driven rollers in contact with the end face of the protective layer film 5 to prevent the self-adhesive extending from the end face of the protective layer film 5 from sticking to the driven roller. Similarly, a recess (notch) is formed in a portion of each of guide bars 228, 229, and 244 in contact with the end face of the protective layer film 5.

If the thickness or the press ratio of the supplied sheet material T with protective layer largely varies among lots or the like, the compression ratio cannot be held constant unless the dimensions with which the lower surface of the suction block 17 compresses the soft part are changed. If it is necessary to set a very narrow allowable range for the compression ratio in order to keep the quality (requirements for, e.g., the cut shape and accuracy of the soft part 1), a means such as a lever-type thickness measuring unit is arranged between the reel unit 100 and the cutting separating unit 500 to measure the thickness and press ratio of the supplied sheet material T in advance. Additionally, it is possible to replace the eject cylinder 276 with a numerically controlled type cylinder, omit the stopper 279, and change the ascent end position of the suction block 17 by feeding back the measurement data obtained by the measuring unit. Consequently, a fixed compression ratio can be constantly obtained even if the thickness or the press ratio of the sheet material T more or less changes.

As described above, it is possible to improve the shape accuracy of the soft part 1 cut from the sheet material T with protective layer film (i.e., to prevent offsets along the edge line (boundary) of the film or the formation of oblique cut surfaces), and prevent the sticking of the self-adhesive of the protective layer film or the adhesion of the soft part 1 to a peripheral member. Consequently, it is possible to prevent apparatus stop troubles caused by the sticking or adhesion of the self-adhesive extending from the protective layer film end face, and improve the operating efficiency.

The function of a temporary table 501 will be described below with reference to FIG. 8. When the temporary table 501 returns from the cutting position to the waiting position and a pin 291 turns off suction and descends to move away from the soft part 1, a pasting finger 293 ascends and moves in the Y direction to move the soft part 1 to the pasting position. Subsequently, the pasting finger 293 descends in the Z direction to paste the soft part 1 onto the work 700.

During the operation, tension is constantly applied to the sheet material T. Also, pitch feed is performed at the timing at which the cutting blade 11 is not in contact with the sheet material T.

FIG. 19 shows the timings in one cycle. The operation of the pasting finger in FIG. 19 is for the soft part 1 cut in an immediately preceding cycle. (The cutting separating operation and the pasting finger operation are separated.)

In the first embodiment, the temporary table linearly moves from the waiting position to the soft part transfer position. However, the temporary table can also rotate. Furthermore, if rotation through an arbitrary angle can be selected as the movement of the temporary table (e.g., the rotating operation is numerically controlled), variations of the apparatus layout are increased.

The suction force of the suction block 17 is switched between strong and weak forces; i.e., the suction force is strengthened only in separating the soft part 1 from the release sheet and weakened while the soft part 1 is held in the cutting blade 11. Consequently, the deformation of the soft part 1 by the suction is suppressed, and the soft part 1 with a stable shape is transferred to the temporary table.

When the apparatus further includes a mechanism [e.g., operations (shift and pitch conversion) along the X and Y axes, θ (rotating) operation] for converting the position of the soft part 1 held on the temporary table, variations of the layout are increased, and the arrangement of the pasting finger used after the temporary table can be more simplified.

As described above, the soft part 1 is cut by using ultrasonic vibration, and the cut soft part 1 is directly separated in the cutting position and temporarily placed on the temporary table. Consequently, the following effects can be obtained, and the reliability and the productivity can be improved.

The pasting step of pasting the soft part 1 held by suction in the contoured cutting blade onto a predetermined position can be automated without moving the contoured cutting blade which is generally large and heavy or moving a work on which the soft part 1 is to be pasted to the position of the cutting blade. Accordingly, it is possible to achieve highly versatile automation unaffected by the shape of the cutting blade, the sheet, or the work. Also, since the sheet on the table means is held by suction by the suction pin, the positional deviation of the sheet on the table means can be prevented. This makes accurate automation of the pasting position possible. When the sheet on the table means is raised by, e.g., suction chucking by the pasting finger by vertically moving the suction pin for holding the sheet on the table means by suction, the pasting finger draws the sheet material by suction, and the suction pin is moved downward before the hand is raised. Consequently, the suction can be performed without causing any handling errors resulting from the sticking of the suction pin to the self-adhesive layer of the sheet. Since the table means is moved, a work area can be secured around the table means when the sheet on the table means is subjected to the next operation (suction handling by the pasting finger). This makes automation of the pasting step feasible while the degree of freedom of the apparatus construction is increased. Limitations imposed by the installation of the pasting finger unit are removed, so a pasting finger with an optimum arrangement and an optimum shape is realized. Wide variations of the apparatus layout are also possible, and this improves the versatility. Consequently, the operating efficiencies and the non-defective ratios of the apparatus, the soft part 1, and the work on which the soft part 1 is pasted can be improved.

Figure 27A:
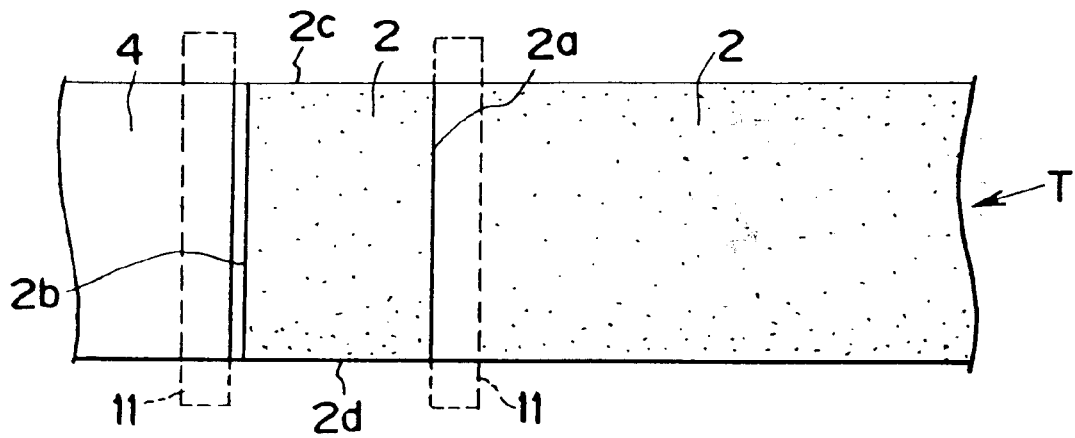
FIG. 27A is a view (plan view) for explaining the operation of cutting the sheet material T narrower than the cutting blade.
Figure 27B:
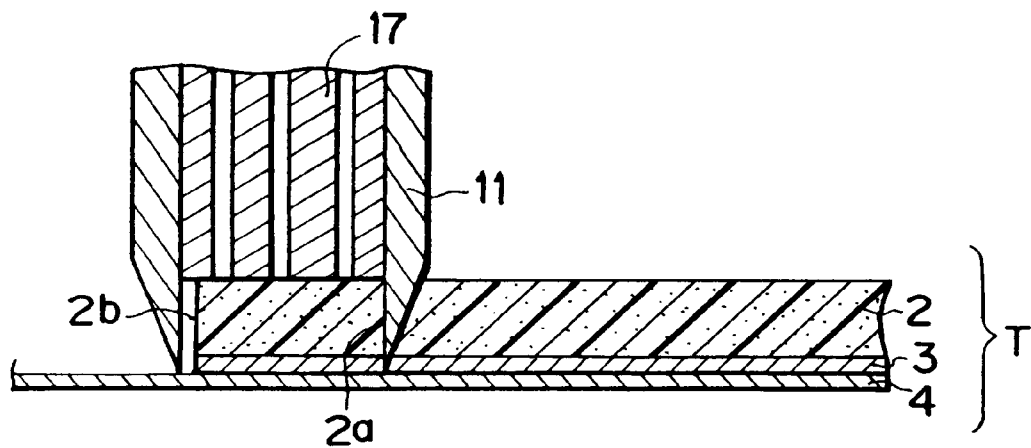
FIG. 27B is a view (side view) for explaining the operation of cutting the sheet material T narrower than the cutting blade.

Next, the sheet material T is half-cut into a rectangular shape a shown in FIGS. 27A and 27B by a cutting separating unit 400. That is, the sheet material T and a double-coated tape adhesive layer 3 are cut into the shape shown in FIGS. 27A and 27B, whereas the release sheet 4 is left uncut although this shape is slightly cut (marked) on the sheet. As shown in FIGS. 27A and 27B, only a portion 2a of the porous soft member 2 is cut.

Assume that the soft part 1 having a shape and a material meeting one or more of conditions (1) to (3) described below is an object to be processed. (1) The thickness of the sheet is large. (2) The cut shape of the sheet is small, and the ratio of the peripheral length of the cut surface to the area of the cut sheet is large. (3) The material of the sheet is soft, and the thickness of the cut sheet is largely reduced by the suction force.

If the method of separation using compression and suction in the contoured cutting blade with ultrasonic wave application is performed for the soft part 1 having the shape and material described above, the shapes of particularly the upper surface in the direction of thickness and the cut surfaces of the soft part 1 transferred to the pasting means after compressed and held by suction in the contoured cutting blade unstably deform. A few seconds to a few tens of seconds are necessary before the deformation is corrected (the thickness is restored). Also, in terms of the tact or the like factor, if this deformed sheet is directly subjected to the placing step and the subsequent pasting step, the pasting accuracy of the sheet suffers.

Accordingly, to stabilize the shape of particularly the cut sheet and automate the soft part pasting step, the sheet is transferred to the table means by air blow when the half-cut soft part 1 is drawn by suction inside the contoured cutting blade 11 by the suction head 17 in the contoured cutting blade 11, separated from the release sheet, and simultaneously held by suction in the contoured cutting blade 11.

Also, since the strong and weak suction forces can be switched, the suction force is strengthened when the sheet is separated from the release sheet 4 and weakened while the separated sheet is held. The edge sectional shape of the contoured cutting blade has symmetrical or asymmetrical angles on the two sides in the blade thickness direction (=this is not a pure half-side blade having an angle only on the outside). The blade edge in the thickness direction is in an arbitrary position (the blade edge can be set in an arbitrary eccentric position on the inside or the outside along the blade thickness direction).

As described above, the shapes of particularly the upper surface in the thickness direction and the cut surfaces of the part transferred to the table means after compressed and held by suction in the contoured cutting blade 11 unstably deform, and a few seconds to a few tens of seconds are necessary before the deformation is corrected (the thickness is restored). To prevent this phenomenon, the cut part is transferred to the table means by blowing air (forcedly supplying compressed air to the upper surface of the sheet). Consequently, the deformed portion of the soft part 1 can be corrected (the thickness can be restored) within a short time period.

Additionally, since ultrasonic vibration is performed after the cutting blade descends (the sheet is compressed by the cutting blade), the soft part 1 is ultrasonically shaken while being compressed by the cutting blade. This greatly decreases the degree of deformation of the soft part 1 compared to a method which ultrasonically shakes the soft part 1 before cutting.

Also, the suction force for the soft part 1 compressed and held by suction in the contoured cutting blade must be equal to or larger than the separation force (=the tack strength between the release sheet and the double-coated tape) in the steps of cutting and separating the soft part 1 from the release sheet 4. However, it is only necessary to hold the soft part 1 in the steps of transferring the separated soft part 1 to the table means. Therefore, the suction force for holding the soft part by suction in the contoured cutting blade can be switched between the strong and weak forces; i.e., the suction force is strengthened in the steps of cutting and separating the soft part from the release sheet and weakened after the separation. This shortens the time during which the thickness is decreased by the strong suction force. Additionally, even if the shape deforms, the time during which the suction force is weak can be used for correction and restoration. This decreases the degree of deformation of the soft part 1 when the soft part 1 is placed.

The edge sectional shape of the contoured cutting blade has symmetrical or asymmetrical angles on the two sides in the blade thickness direction, i.e., the blade edge section has a symmetrical or asymmetrical shape (=the blade edge shape also having an angle on the inside blade edge for forming a cut surface on the side of a sheet to be cut and separated). Consequently, the cut surface is compressed by the inside angle of the blade edge, and this prevents the double-coated tape self-adhesive layer of the cut sheet from rising toward the upper surface of the sheet when the sheet is drawn by suction. This eliminates the sticking of the upper and lower surfaces of the sheet cut surface caused by the double-coated tape self-adhesive layer.

By the above action, the deformation amount of the shape of the soft part 1 before the soft part 1 is placed can be minimized. At the same time, even if the shape slightly deforms, this deformation can be corrected when the soft part 1 is transferred to the table means. Consequently, the shape of the sheet on the table means can be constantly stabilized without extending the time (tact).

That is, when the soft part 1 on the table means is raised by, e.g., suction chucking by the pasting finger, the pasting finger can constantly draw the sheet with a stable shape by suction. Consequently, the pasting step having high pasting position accuracy and also advantageous in tact can be automated.

Figure 28:
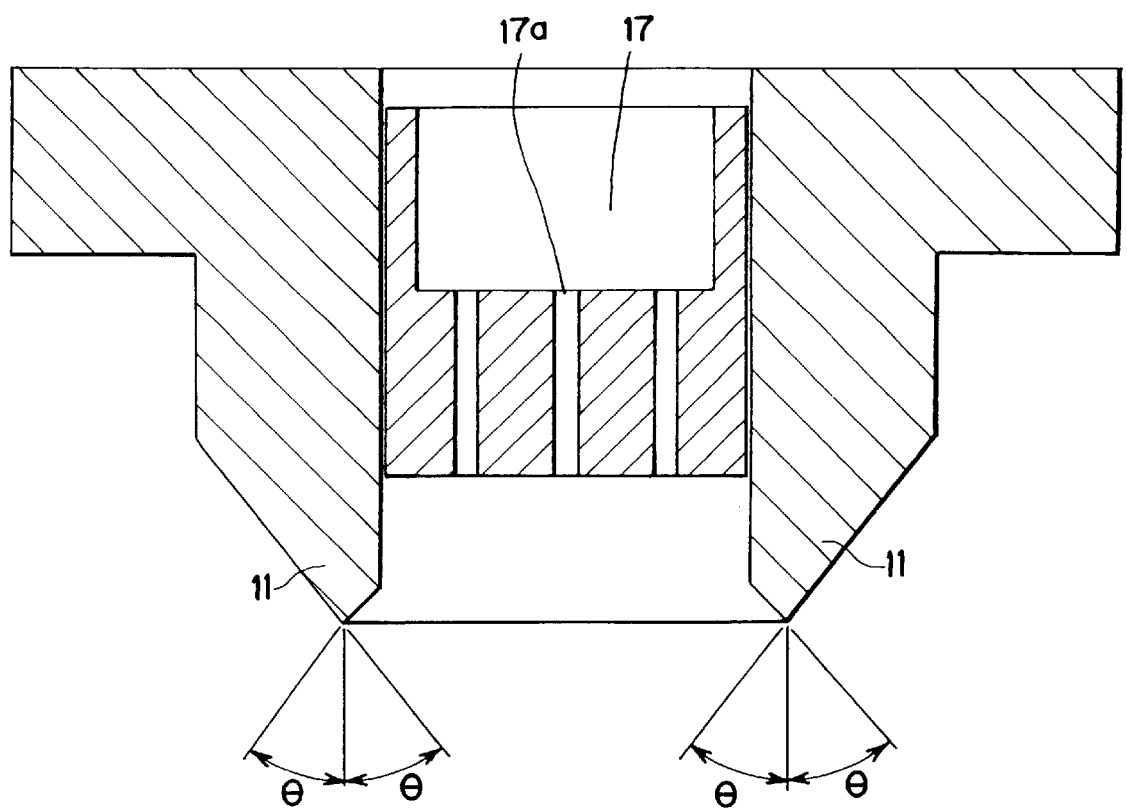
FIG. 28 is a view showing piping for air blow.

FIG. 28 is a view showing the piping for air blow. The same reference numerals as in the above description denote the same parts already described above, and a detailed description thereof will be omitted. A large number of suction holes 17a about 1 mm in diameter are formed in the lower surface (the suction surface for the soft part 1) of the suction block 17. Suction air (negative pressure) is supplied to the suction holes 17a from a vacuum generator 82 connected to a pipe joint attached to a manifold 274. The mechanism of piping from the suction block 17 to the vacuum generator 82 is as follows. That is, a vacuum solenoid valve 94 for switching between positive and negative air for suction and blow by the suction block 17, a pipe joint 96, and the suction block 17 are connected in this order from the vacuum generator 82. One end of the vacuum solenoid valve 94 is connected to the vacuum generator 82, and the other end is connected to a positive pressure source for air blow via a throttle 95. The pipe joint 96 is connected to a vacuum solenoid valve 97 and a throttle 98 for air leak in addition to the above piping mechanism. The air blow amount is adjusted by controlling the throttle 95. Fine adjustment when the suction force of the suction block 17 is switched to the weak force is performed by adjusting the leak amount by the throttle 98.

A seal member 83 is provided to seal suction air leaking from a fine gap between the inner periphery of the cutting blade 11 and the suction block 17. In this embodiment, the seal member 83 is made from a resin material fitted on the outer periphery of the suction block 17.

Referring back to FIG. 8, the cut and separated soft part 1 is fixed to the lower surface of the suction block 17 by suction (the suction force is strong during separation and weak after separation) when the separating unit 400 ascends (in the ascent end position of the cutting cylinder 261 and the eject cylinder 276). The eject cylinder 276 descends on a soft part receiver 288 moved to a position below the cutting blade 11, the suction by the suction block 17 is turned off, and air blow is performed. In this manner the temporary table unit 500 transfers the soft part 1.

A plurality of projections are formed on the upper surface of the soft part receiver 288 to prevent the sticking of the double-coated tape on the lower surface of the soft part (to decrease the area in contact with the double-coated tape). The soft part receiver 288 is guided by a linear guide 290 and moved between a soft part transfer position and a waiting position by a moving cylinder 289. A hollow pin 291 for fixing the soft part 1 by suction is formed in a position substantially corresponding to the center of the soft part 1 transferred to the soft part receiver 288. The hollow pin 291 is so formed that the upper end of the hollow pin 291 is even with the upper surface of the soft part receiver 288 in the ascent end position of the cylinder 292. The descent of the cylinder 292 is performed for escape operation by which the upper end of the hollow pin 291 moves away from the double-coated tape on the lower surface of the soft part.

While the soft part 1 is transferred onto the soft part receiver 288 and moved to the waiting position by the moving cylinder 289, the pin 291 holds the soft part 1 by suction (suction ON). Thereafter, the pin 291 turns off the suction and descends.

The soft part 1 placed on the temporary table unit 500 (waiting position) is separated by, e.g., suction chucking from the temporary table unit by a pasting finger 293 of a pasting finger unit 600, transferred by a biaxial AH, and pasted on a predetermined work 700 held by a positioning means (not shown).

Figure 29:
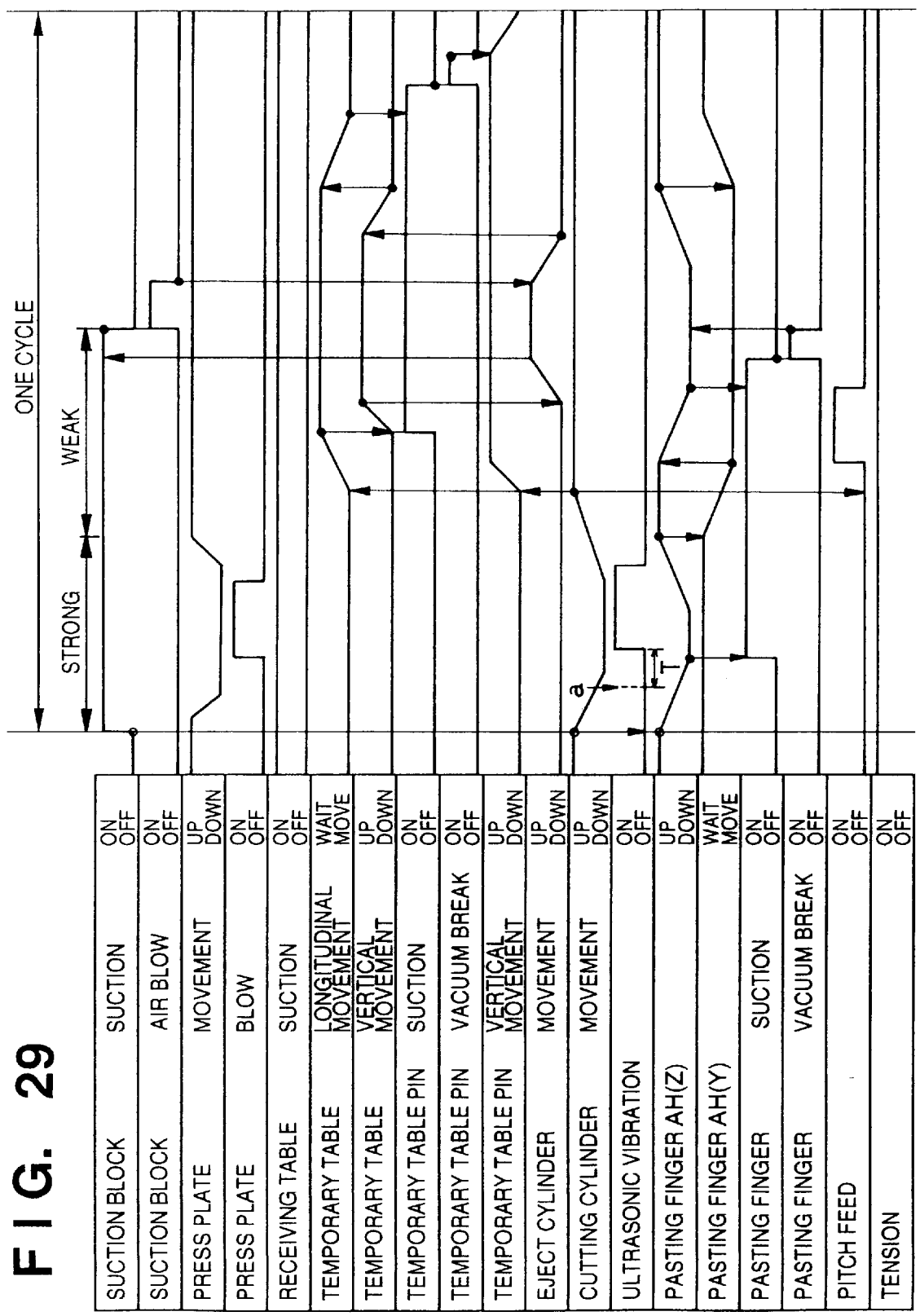
FIG. 29 is a sequence diagram for explaining the operation of the apparatus.

The operation of the apparatus with the above arrangement will be described below with reference to a sequence diagram in FIG. 29. In FIG. 29, reference symbol "○" indicates a start signal of one cycle; "●", an operation completion signal; and "↑" or "↓", the start of the next operation upon reception of operation completion confirmation. The same reference numerals as in the above description denote the same parts already described above, and a detailed description thereof will be omitted. That is, only unexplained characteristic operations will be described below. When a cutting cylinder 261 starts descending, a proximity switch 246 is switched on before (or at the same time) the cutting blade 11 comes in contact with the sheet material T. Upon receiving this signal and after a set timer T expires, an ultrasonic generator 254 causes a horn 6 to start longitudinal ultrasonic vibration, and the sheet material T is vibrated from the side of the release sheet 4. (Reference symbol "a" in FIG. 29 denotes ON of the signal from the proximity switch 246; and T, the set timer). The cutting blade 11 comes in contact with the ultrasonically shaken sheet material T, and the cutting cylinder 261 descends to compress the sheet material T. After the descent of the cutting cylinder 261 is stopped by a stopper 267, the set timer T expires, and ultrasonic wave application is started from this state of the cutting blade 11 and the sheet material T. Consequently, the soft part 1 is half-cut from the sheet material T.

The half-cut soft part 1 is separated from the release sheet 4 and drawn by suction to the lower surface of the suction block 17 by the strong suction force of the suction block 17 the suction by which is already started. (In the above position, the compression ratio of the soft part 1 is 1 to ½0.)

After the soft part 1 is completely separated, the cutting cylinder 261 ascends, and a cylinder sensor 247 for sensing the descent end of the cutting cylinder 261 is turned off. Upon receiving this signal, the ultrasonic generator 254 is turned off to complete the longitudinal ultrasonic vibration by the horn 6. Since the cutting cylinder 261 ascends, the soft part 1 moves to the lower surface of the suction block 17 inside the cutting blade 11, thereby completing the cutting separating operation.

While the cutting cylinder 261 is in the descent end position during the cutting separating operation, the sheet material T is fixed by pressing by the work press plate 284 and suction by a receiving table 287. After the separation of the soft part 1 is complete, the suction force of the suction block 17 is switched to the weak force. The temporary table moves to a position below the cutting blade 11, and the suction by the suction block 17 is turned on. Subsequently, the eject cylinder 276 descends, the suction by the suction block 17 is turned off, and air blow is performed. Consequently, the cut and separated soft part 1 fixed by suction to the lower surface of the suction block 17 is transferred onto a soft part receiver 288.

Thereafter, the temporary table returns from the cutting position to the waiting position, and the pin 291 turns off the suction and descends to move away from the soft part 1. Then, the pasting finger descends (in the Z direction) to chuck the soft part 1 on the soft part receiver 288 of the temporary table by suction. The pasting finger then ascends (in the Z direction) and moves in the Y direction to move the soft part 1 to the pasting position. Subsequently, the pasting finger descends (in the Z direction) to paste the soft part 1 on the work 700.

Tension is constantly applied to the sheet material T. Also, pitch feed is performed at the timing at which the cutting blade 11 is not in contact with the sheet material T.

In the above embodiment, the suction forces for the soft part 1 are switched after the cutting and separation are complete and before the eject cylinder of the suction block descends. However, another vertical motion can also be added to the temporary table or the eject cylinder. If this is the case, the suction force is switched to "weak" after the soft part 1 is ejected. After the shape is completely restored, additional ascending (or descending) motion is performed, and air blow is performed to transfer the soft part 1 to the temporary table. Consequently, it is expected that the shape of the soft part 1 is further stabilized and the accuracy of the position of the soft part 1 to the temporary table is further improved.

Also, it is possible to perform the switching of the suction force of the suction block 17 between finer stages than the two stages of strong and weak forces to perform optimum suction force control.

Figure 30:
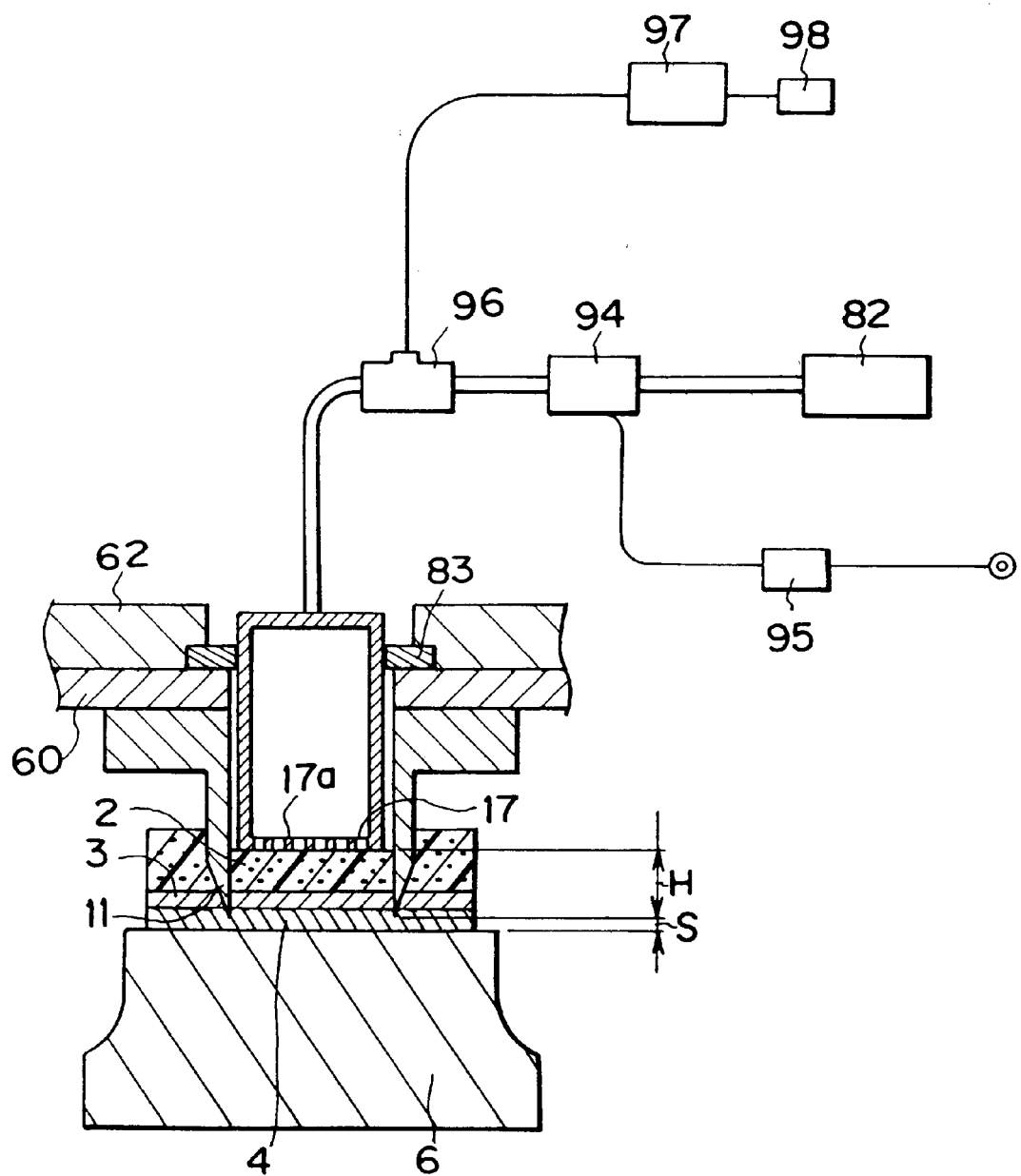
FIG. 30 is a sectional view of the cutting blade 11.
Figure 32:
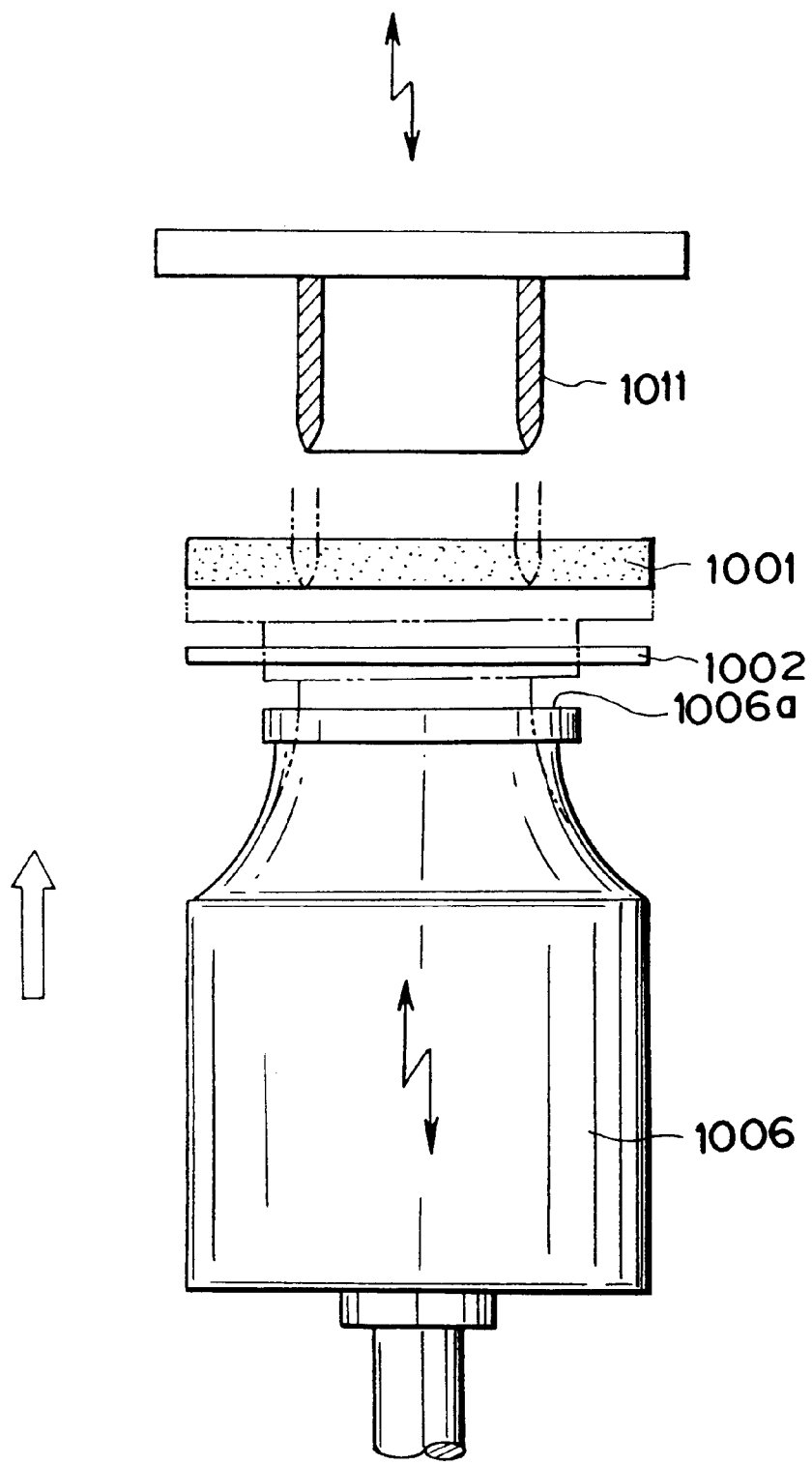
FIG. 32 is a view for explaining the operation of conventional ultrasonic cutting.

Furthermore, as the angle and shape of the edge of the cutting blade, it is only necessary to form angles on the inside and outside of the blade as shown in FIG. 30. That is, wide variations of the blade edge shape can be made in accordance with the material and shape of the soft part 1, e.g., two steps of optimal angles can be formed or the blade edge can have an R shape.

As described above, the soft part 1 is cut by using ultrasonic vibration and directly separated in the cutting position. Consequently, the shape of the soft part 1 transferred onto the table means can be constantly stabilized without extending the time (tact). Accordingly, when the soft part 1 on the table means is raised by, e.g., suction chucking by the pasting finger, the pasting finger can constantly draw the soft part 1 with a stable shape by suction. Consequently, the pasting step having high pasting position accuracy and also advantageous in tact can be automated.

That is, the improvements of the reliability and the productivity stabilize the shape and accuracy of the separated soft part 1, improve the apparatus tact (tact up), and improve the operating efficiencies and non-defective ratios of the apparatus, soft parts 1, and works on which soft parts 1 are pasted. Also, since the soft part 1 is cut by using ultrasonic waves, the output required for the cutting is decreased, and this makes it possible to miniaturize and simplify the cut portion and arrange the cut sheet suction separating mechanism in the cut portion. Additionally, cutting and separation can be simultaneously performed, the soft part 1 can be moved into the closed contoured cutting blade without any positional deviation. This simplifies the apparatus construction. Consequently, the soft part 1 can be pasted on a toner cartridge 900 of a copying machine as shown in FIG. 31.

If the compression ratio is excessively increased, the thickness of the soft part 1 decreases, and the material surface of the film melts down. Also, since the temporary table is provided, the pasting step of pasting the sheet can be automated without moving the large and heavy contoured cutting blade or moving a work on which the sheet is to be pasted to the position of the cutting blade. Accordingly, it is possible to achieve automation unaffected by the shape of the cutting blade, the sheet, or the work on which the sheet is pasted. Also, since the sheet on the table means is held by suction by the suction pin, the positional deviation of the sheet on the table means can be prevented. This makes accurate automation of the pasting position possible. When the sheet on the table means is raised by, e.g., suction chucking by the pasting finger by vertically moving the suction pin for holding the sheet on the table means by suction, the pasting finger draws the sheet material by suction, and the suction pin is moved downward before the hand is raised. Consequently, the suction can be performed without causing any handling errors resulting from the sticking of the suction pin to the self-adhesive layer of the sheet.

Since the table means is moved, a work area can be secured around the table means when the sheet on the table means is subjected to the next operation (suction handling by the pasting finger). This makes automation of the pasting step feasible while the degree of freedom of the apparatus construction is increased.

As has been described above, the present invention can provide soft part cutting and pasting methods and soft part cutting and pasting apparatuses capable of cutting and pasting without human intervention by using an automatic soft part apparatus which uses a sheet material continuously formed from a release sheet having at least a release layer on a surface and including continuously formed tack paper and a soft member having an adhesive layer temporarily adhered to the release layer to finally adhere to an article, and cuts the soft member with the adhesive layer into a predetermined shape.

As many apparently widely different embodiments of the present invention can be made without departing from the spirit and scope thereof, it is to be understood that the invention is not limited to the specific embodiments thereof except as defined in the appended claims.

What is claimed is:

1. A soft part cutting method which uses a sheet material continuously formed from a continuously formed release sheet having at least a release layer on a surface and a soft member having an adhesive layer, and cuts the soft member together with the adhesive layer into a predetermined shape, comprising the steps of:

providing a cutting blade for cutting both the soft member and the adhesive layer away from the release layer, wherein the cutting blade has a predetermined shape corresponding to a cutting shape and surrounds a first suction unit;

applying a suction force by a second suction unit to hold the sheet material;

moving the cutting blade towards the sheet material so that the cutting blade reaches a cutting position at which the cutting blade cuts into the soft member, and stopping the cutting blade at the cutting position;

starting vibration of a vibrating unit including ultrasonic waves for transmitting vibration to the second suction unit;

after applying the vibration, applying a suction force by the first suction unit;

moving the cutting blade to cut through the soft member and into the adhesive layer, thereby obtaining the soft member; and stopping the suction force of the first suction unit to release the soft member and the adhesive layer from inside the cutting blade, wherein a thickness of the soft member in a natural state is T1 and a thickness of the soft member compressed by the first suction unit is T2, and with a predetermined compression ratio defined by T2÷T1, the compression ratio of the soft member varies from 1 to 0.1.

2. The method according to claim 1, wherein the suction force by the second suction unit is adjusted to be larger than the suction force by the first suction unit.

3. The method according to claim 1, wherein the compression ratio of the soft member is less than 1 and greater than 0.1.

* * * * *

UNITED STATES PATENT AND TRADEMARK OFFICE
CERTIFICATE OF CORRECTION

PATENT NO. : 6,095,023
DATED : August 1, 2000
INVENTOR(S) : Hiromitsu Harada et al.

It is certified that error appears in the above-identified patent and that said Letters Patent is hereby corrected as shown below:

Column 10,
Line 48, "f" should be deleted.
Line 49, "or" should read -- for --.

Column 16,
Line 7, "guide s" should read -- guides --.

Column 22,
Lines 22 and 25, "projective" should read -- protective --.

Signed and Sealed this

Twenty-sixth Day of October, 2004

JON W. DUDAS
*Director of the United States Patent and Trademark Office*